(12) United States Patent
Payne et al.

(10) Patent No.: US 7,703,003 B2
(45) Date of Patent: Apr. 20, 2010

(54) XML DOCUMENT FRAMEWORKS

(75) Inventors: Geoff Payne, Leics (GB); Paul Harrison, Hungerford (GB); Peter Black, Woking (GB); Elizabeth E. Bell, Tijeras, NM (US)

(73) Assignee: Oracle America, Inc., Santa Clara, CA (US)

( * ) Notice: Subject to any disclaimer, the term of this patent is extended or adjusted under 35 U.S.C. 154(b) by 1304 days.

(21) Appl. No.: 10/256,345

(22) Filed: Sep. 27, 2002

(65) Prior Publication Data

US 2003/0066028 A1 Apr. 3, 2003

(30) Foreign Application Priority Data

Oct. 1, 2001 (GB) ................................. 0123550.6

(51) Int. Cl.
*G06F 17/21* (2006.01)
*G06F 17/30* (2006.01)

(52) U.S. Cl. .................. 715/234; 715/255; 715/272; 707/100; 707/104.1

(58) Field of Classification Search .............. 715/500, 715/526, 530, 513, 517, 515, 224, 236, 255, 715/234, 210, 229, 239, 272; 705/1, 7–9; 707/1, 104.1, 100

See application file for complete search history.

(56) References Cited

U.S. PATENT DOCUMENTS

| | | | | |
|---|---|---|---|---|
| 5,267,155 | A | | 11/1993 | Buchanan et al. ............. 364/419 |
| 5,446,653 | A | | 8/1995 | Miller et al. ................. 364/401 |
| 5,778,378 | A | * | 7/1998 | Rubin ..................... 707/103 R |
| 5,793,966 | A | * | 8/1998 | Amstein et al. ............. 709/203 |
| 5,806,071 | A | * | 9/1998 | Balderrama et al. ........ 707/104.1 |
| 5,987,480 | A | * | 11/1999 | Donohue et al. ............ 715/207 |
| 6,014,678 | A | * | 1/2000 | Inoue et al. ................. 715/206 |
| 6,295,513 | B1 | * | 9/2001 | Thackston ....................... 703/1 |
| 6,377,956 | B1 | * | 4/2002 | Hsu et al. ................. 707/104.1 |
| 6,442,567 | B1 | * | 8/2002 | Retallick et al. .......... 707/104.1 |
| 6,873,992 | B1 | | 3/2005 | Thomas ....................... 707/102 |
| 6,928,610 | B2 | * | 8/2005 | Brintzenhofe et al. ........ 715/517 |
| 6,938,203 | B1 | * | 8/2005 | Dimarco et al. ............. 715/209 |
| 2002/0016963 | A1 | * | 2/2002 | Inoue et al. .................... 725/39 |
| 2002/0046235 | A1 | * | 4/2002 | Foy et al. ..................... 709/203 |

(Continued)

FOREIGN PATENT DOCUMENTS

EP 384 257 8/1990

*Primary Examiner*—Adam L Basehoar
(74) *Attorney, Agent, or Firm*—Robert C. Kowert; Meyertons, Hood, Kivlin, Kowert & Goetzel, P.C.

(57) ABSTRACT

An apparatus may be configured to generate document data representing a document for use in providing a service comprising a number of different activities that are to be carried out in providing the service. The apparatus may enable a user to retrieve previously stored document portions in accordance with the activity to which the document portion relates so that it is not necessary for the user to identify a specific document portion, a specific filename or an inventory part number allocated to that document portion. In one embodiment, an apparatus may be configured to generate a document that enables a user to assemble a document in accordance with the activities to which the document relates rather than to the actual content of the document. Thus, the user wishing to assemble a document may be concerned with the activities instead of which precise document portions to include in the document.

45 Claims, 18 Drawing Sheets

U.S. PATENT DOCUMENTS

| | | | |
|---|---|---|---|
| 2002/0078152 A1* | 6/2002 | Boone | 709/204 |
| 2002/0082857 A1* | 6/2002 | Skordin et al. | 705/1 |
| 2002/0194053 A1* | 12/2002 | Barrett et al. | 705/10 |
| 2003/0014442 A1* | 1/2003 | Shiigi et al. | 707/513 |
| 2003/0109936 A1* | 6/2003 | Umen et al. | 700/1 |
| 2004/0199334 A1* | 10/2004 | Kovesdi et al. | 702/27 |
| 2004/0205528 A1* | 10/2004 | Alexander | 715/505 |
| 2005/0182641 A1* | 8/2005 | Ing et al. | 705/1 |
| 2006/0229928 A1* | 10/2006 | Nix, Jr. | 705/9 |

* cited by examiner

| Document Title | PDF | RTF | HTML |
|---|---|---|---|
| Statement of Work | ✓ | ✓ | ✓ |
| Test Plan | ✓ | ✓ | ✓ |
| Delivery Preparation Worksheet | ✓ | ✓ | ✓ |
| Service Definition Document | ✓ | ✓ | ✓ |
| Service Work Plan | ✓ | ✓ | ✓ |
| Resource Requirements Summary | ✓ | ✓ | ✓ |
| Proposals | ✓ | ✓ | ✓ |

XML DOCUMENT FRAMEWORKS

BACKGROUND

1. Field of the Invention

This invention relates to computer systems, and more particularly to document generation.

2. Description of the Related Art

Document generation apparatus such as computers programmed with word processing software are widely available. Users of such word processing software often wish or need to reuse certain standard documents or paragraphs and most word processing software provides facilities whereby standard documents or paragraphs can be retrieved by use of macros or shortcut references.

EP-A-0216063 describes a document preparation process for use in connection with a word processing facility that includes a succinct identification and listing of designated parts of a memorandum or document, each unique part having access to an associated file which contains the basic text and formatting controls for that particular part. The user of the process may readily assemble a document from the parts inventory displayed on a master screen by mere cursor reference or by keying the name of designated parts and have the newly created document displayed, or printed in most cases without reference to additional screens.

The facilities described above enable a user of word processing software to retrieve previously stored standard documents or portions of text using filenames or inventory parts associated with the text. However, it is necessary for the user of the word processing software to identify the filenames or part numbers for the specific portions of text that he or she wishes to insert into their document.

SUMMARY

In one embodiment, one or more apparatus may provide for generating document data representing a document for use in the providing of a service comprising a number of different activities that are to be carried out in providing the service, the apparatus enabling a user to retrieve previously stored document portions in accordance with the activity to which the document portion relates so that it is not necessary for the user to identify a specific document portion or a specific filename or inventory part number allocated to that document portion.

In one embodiment, one or more apparatus may provide for generating a document that enables a user to assemble a document in accordance with the activities to which the document relates rather than to the actual content of the document. Thus, the user wishing to assemble a document may need only concern himself with the activities and it is not necessary for the user to identify the precise document portions that he wishes to include in the document.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the invention as defined by the appended claims. The headings used herein are for organizational purposes only and are not meant to be used to limit the scope of the description or the claims. As used throughout this application, the word "may" is used in a permissive or optional sense (e.g., meaning having the potential or option to), rather than the mandatory sense (i.e., meaning must). Similarly, the words "include", "including", and "includes" mean including, but not limited to.

DETAILED DESCRIPTION OF EMBODIMENTS

Figure 1:
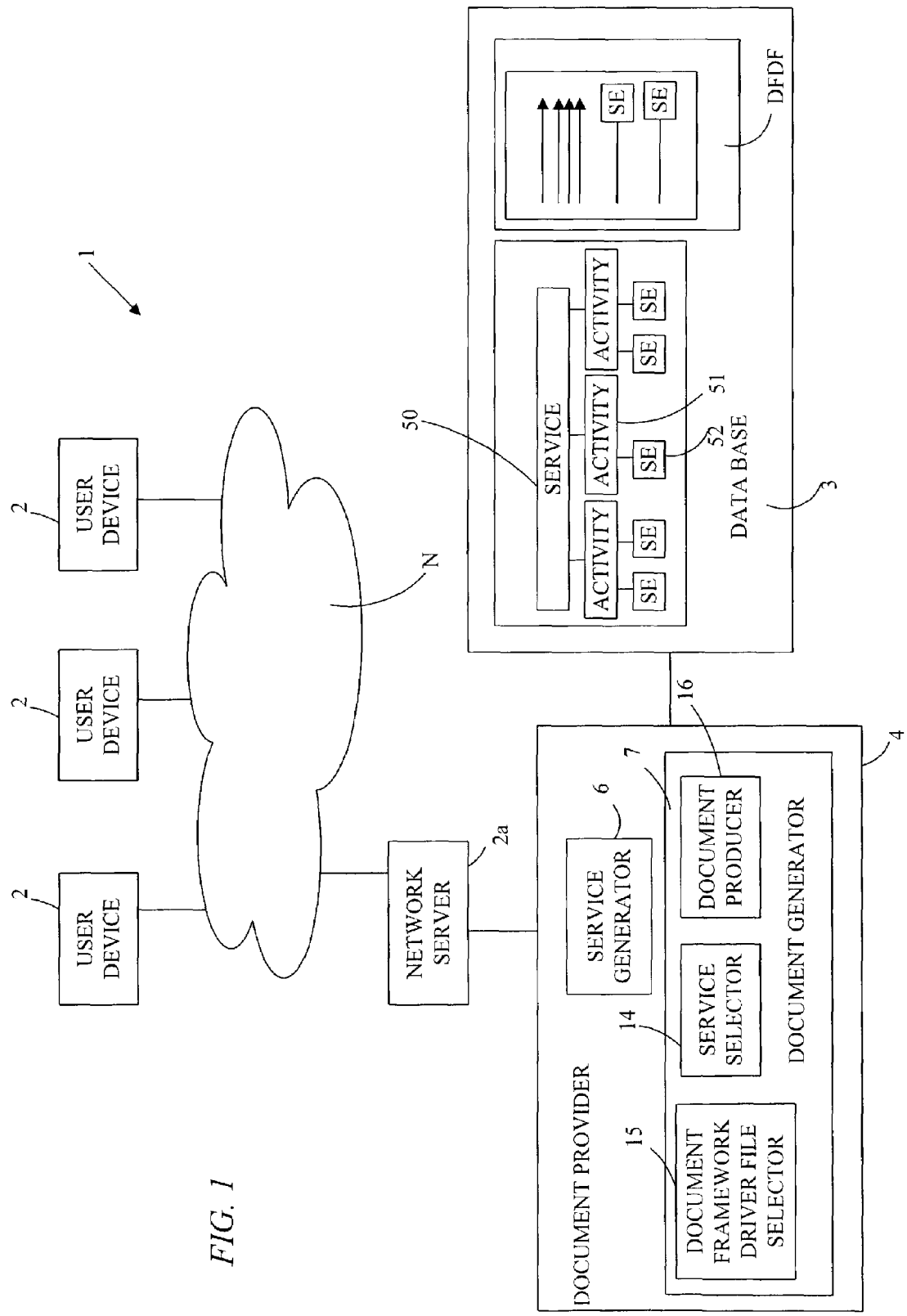
FIG. 1 shows a functional block diagram of a document generation system, according to one embodiment.

Referring now to the drawings, FIG. 1 shows a functional block diagram of an embodiment of a document generation system 1 for generating a document for use in the providing of a service comprising a number of different activities in the form of procedures that are to be carried out when providing the service. The system 1 has a document provider 4 coupled to a database 3. A number (three are shown) of user devices 2 are coupled to the document provider 4 via a network N such as the Internet and a network server 2a.

The database 3 stores representations of services 50 (only one of which is shown in FIG. 1). Each service representation includes activity data for a number of different activities 51 in the form of procedures that may be carried out in providing the service with the activity data for each activity associating the activity with at least one service element (SE) 52 forming a component of the activity and storing service element data associating the service element with data defining text describing that component of the activity. The data base 3 also contains a number of document framework driver files DFDF (only one of which is shown) each defining a document template and including information that defines the service elements SE for which the associated text is to be incorporated in the document to be produced by that template.

The document provider 4 includes a service generator 6 for generating a service for storage in the database 3 in accordance with user instructions received via the network server 2a as will be described in detail below and a document generator 7 for generating data for defining a document. The document generator 7 includes a service selector 14 for selecting one of the services stored in the data base 3 in accordance with user instructions received via the network server 2a, a document framework driver file selector 15 for selecting one of the document framework driver files stored in the data base 3 in accordance with user instructions received via the network server 2a, and a document producer 16 for producing document data representing a document using the selected service and selected document framework driver file.

Figure 2:
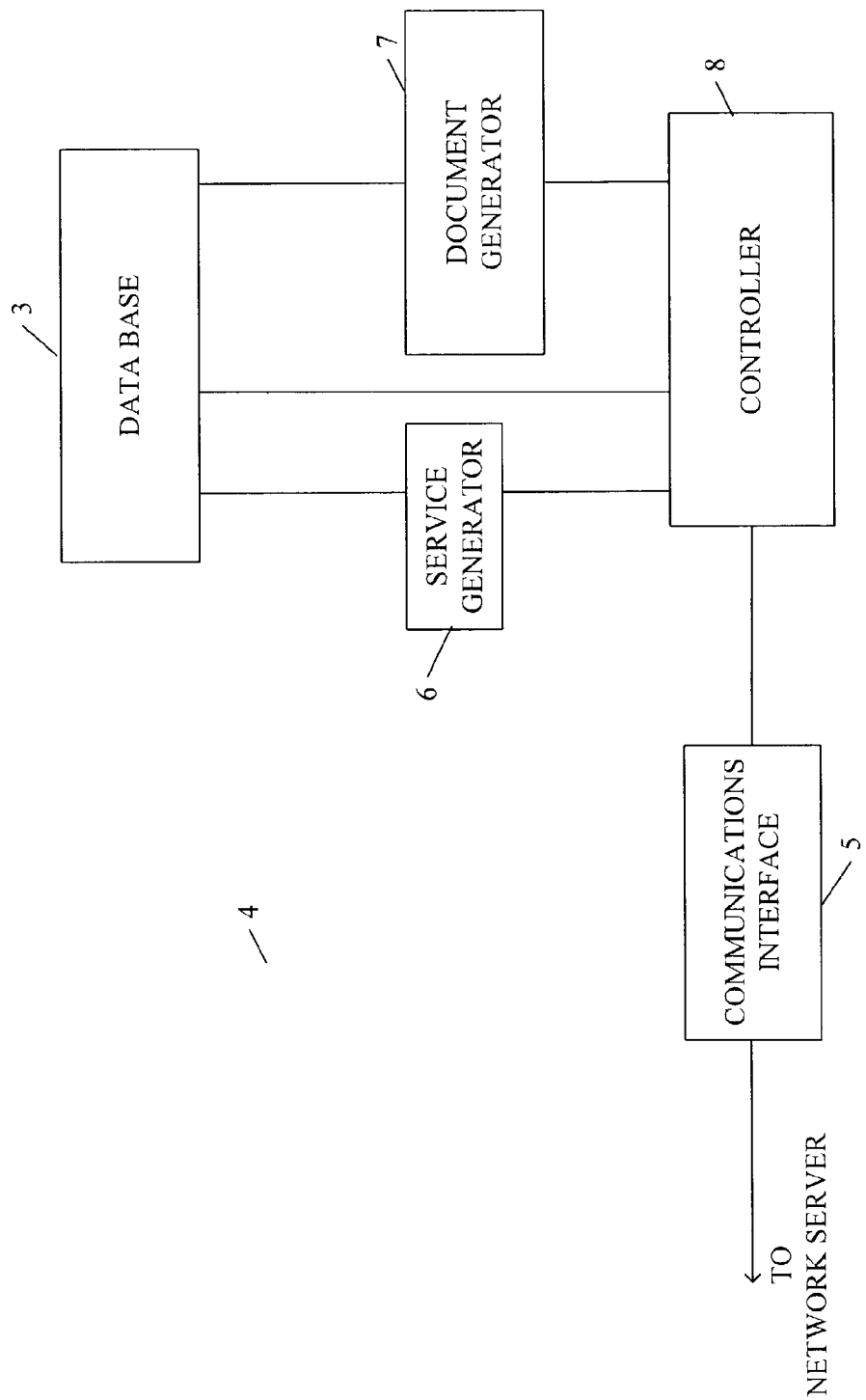
FIG. 2 shows a functional block diagram of a document provider shown in FIG. 1 and its coupling to a data base shown in FIG. 1, according to one embodiment.

FIG. 2 shows the document provider 4 in greater detail. As shown in FIG. 2, the document provider 4 includes a communications interface 5 for communicating with the network server 2a. The communications interface 5 is coupled via a controller 8, which controls overall operation of the document provider 4, to the service generator 6 and the document generator 7.

Figure 3:
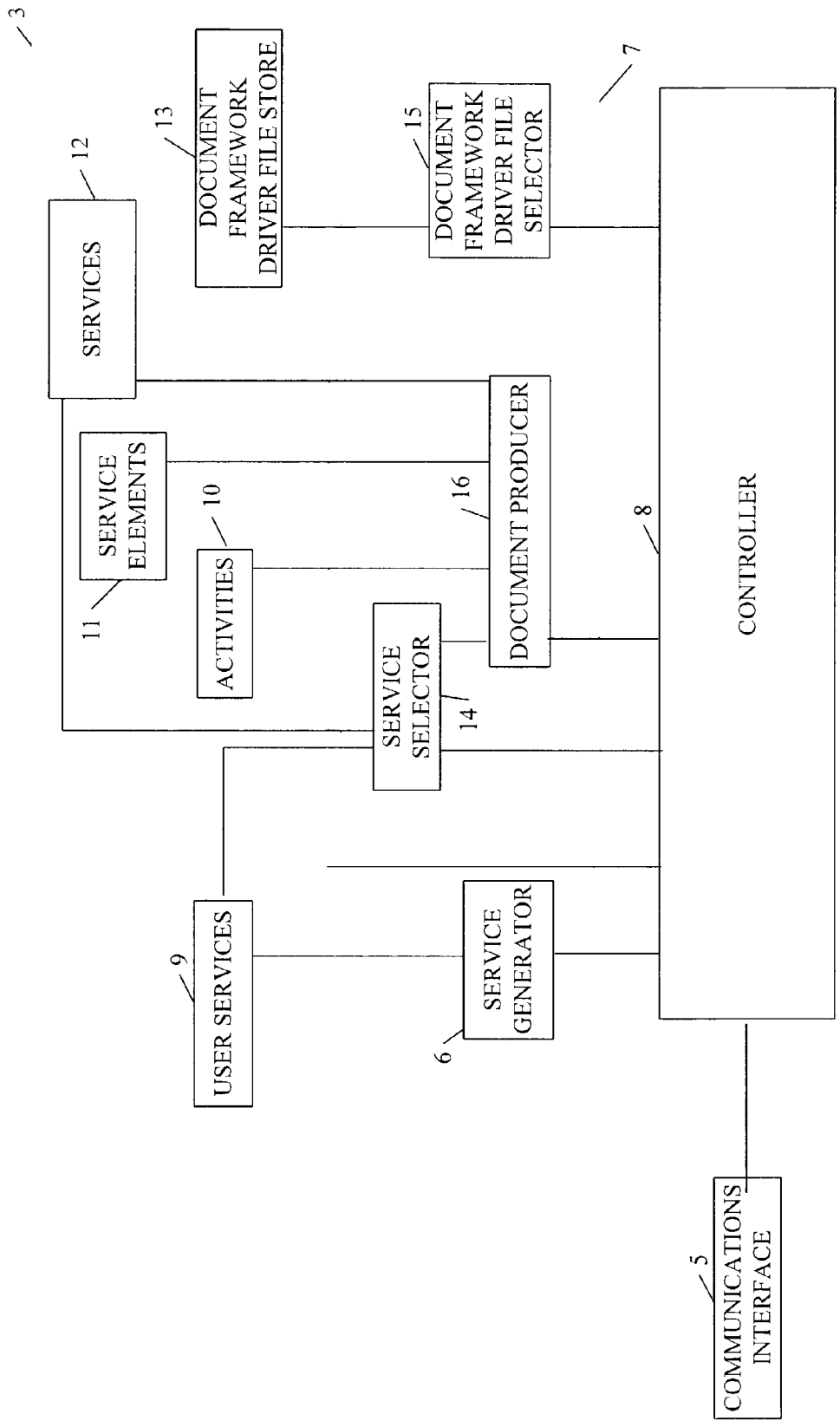
FIG. 3 shows a block diagram illustrating functional components of the document provider and its relationship with the data base, according to one embodiment.

As shown in FIG. 3, the database 3 comprises a number of different data stores including a user services store 9 for storing services generated by the service generator 6 in accordance with data input by a user via the user device 2 and a services store 12 for storing pre-defined services, an activities data store 10 for storing the activity data for different activities, a service elements data store 11 storing service element data containing text data files that may be used in generating a document, and a document framework driver file store 13 storing the document framework driver files DFDF (FIG. 1).

The service selector 14 is coupled to the user services and services stores 9 and 12 while the document framework driver file selector 15 is coupled to the document framework driver file store 13 and the document producer 16 is coupled to the activities data, service elements data and services stores 10, 11 and 12.

Figure 4:
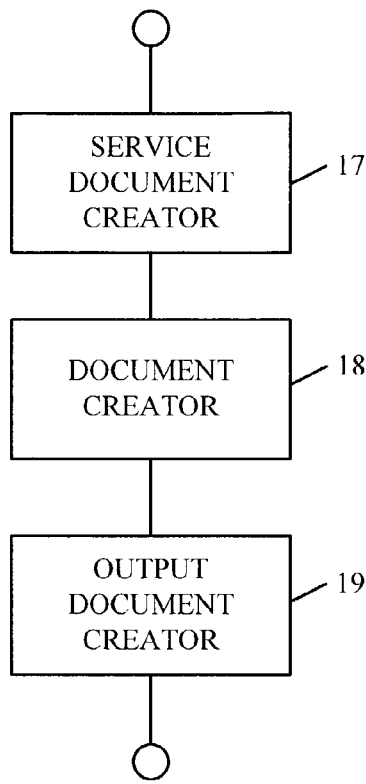
FIG. 4 shows a functional block diagram of a document producer shown in FIG. 3, according to one embodiment.

The document producer 16 includes, as shown in FIG. 4, of a service document creator 17, a document creator 18 and an output document creator 19. The service document creator 17 assembles data associated with a service retrieved by the service selector 14 to enable the document creator 18 to create the document in a standard format, in this example XML (extensible Mark up Language). The output document creator 19 is provided to convert the standard format created by the document creator 18 to a specific output format selected by the user, such as, as will be described below, document formats PDF (Portable Document Format), RTF (Rich Text Format) and HTML (Hyper Text Mark up Language).

Figure 5:
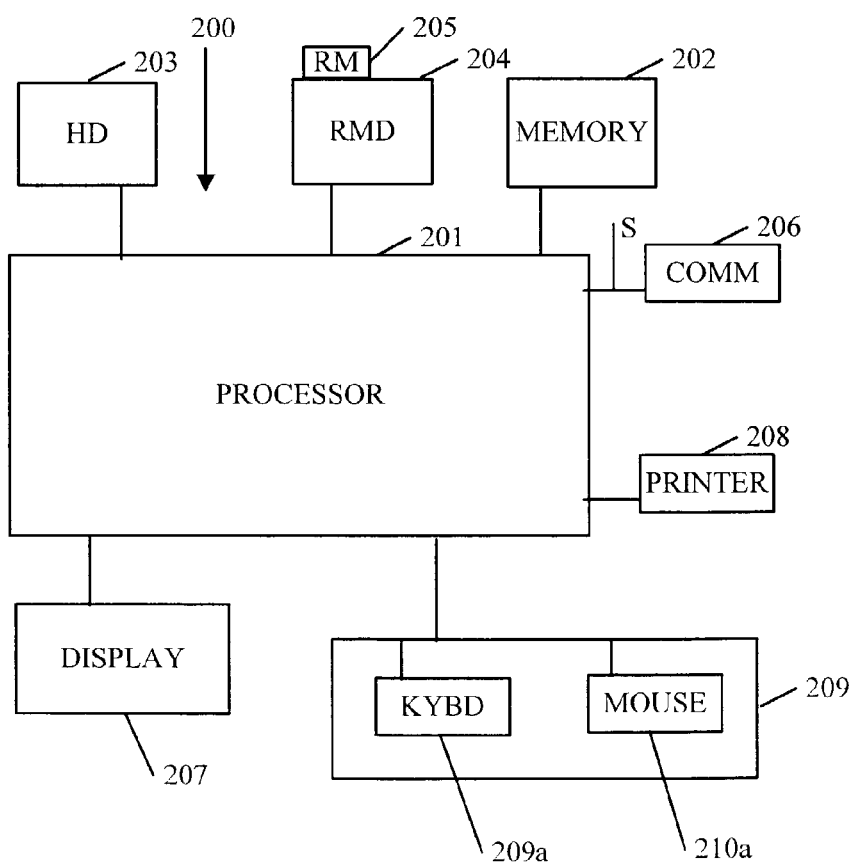
FIG. 5 shows a block diagram of computing apparatus programmable by processor implementable instructions to form part of the document system shown in FIG. 1 such as the document provider, according to one embodiment.

The user device 2, network server 2a, database 3 and document provider 4 are provided by a computing apparatus or a number of computing apparatuses programmed by processor implementable instructions. FIG. 5 shows a block diagram of typical computing apparatus 200 which includes a processor 201 having memory 202 (ROM and/or RAM), a mass storage device such as a hard disk drive (HID) 203, a removable medium drive (RMD) 204 for receiving a removable medium (RM) 205 such as a floppy disk, CDROM or DVD drive, a communications interface (COMM) 206 such as a MODEM for communicating with other computing apparatus, a display such as a CRT or LCD display 207, an output device in the form of a printer 208 and a user input device 209 comprising a keyboard 209a and a pointing device such as a mouse 210a.

The processor 201 is programmed by processor implementable instructions and data to provide the document provider 4, database 3, network server 2a, or user device 2 as the case may be. The processor implementable instructions may be pre-stored in the memory 202 or on the mass storage medium 203, may be downloaded as a signal S via the communications interface 206, may be supplied by and downloaded from a removable medium 205 inserted in the removable medium drive 204 or by any combination of these routes. Data may also be stored in the mass storage medium 203 by any of these routes.

In one embodiment, the computing apparatus is configured by processor implementable instructions to operate in accordance with the JAVA™ platform, the network server 2a is configured as a web server and the user device 2 is configured in accordance with conventional web browser software to enable communication with the network server 2a via the Internet. The database 3 is in this example an Oracle™ database.

The use of the document generation system to generate documents that may be required in the provision of a service to a customer will now be described. In the particular example to be described the service to be provided to the customer relates to the installation of a network server, in this example the Sun Enterprise 10000™ Server produced by Sun Microsystems, Inc, at the customer's premises and provision of related services including, if necessary, software and hardware components to set up or enable configuration of the customer's internal computer network for compatibility with the server.

As will now be explained in detail below, the document generation system enables generation of documents to enable provision of the service without the user having to identify the specific components in a particular document.

The manner in which a service representation is provided will now be described. The database 3 contains in the activities data store 10 activity data relating to activities that may be undertaken as part of a service, that is procedures that may be carried out in providing the service. Examples of activities that may be carried out in the supply and installation of a computer system are:

service initiation, that is the initial planning and resource determining activity with the customer;

design activity, that is the specification of the computer system including hardware, software and network configuration requirements;

installation and design implementation, that is the activity of installing, coordinating and overseeing the installation and implementation of the system;

testing, that is the activity of testing of the installed and implemented system;

and so on.

The activity data for each activity associates the activity with a number of service elements that form components of the activity. Each service element is associated with service element data stored in the service elements data store 11 and defining text describing that component of the activity. Examples of activity components include a description of the activity, inputs and outputs (deliverables) for the activity, assumptions relating to the activity, and sub-activities or sub-plans associated with the activity.

Figure 6:
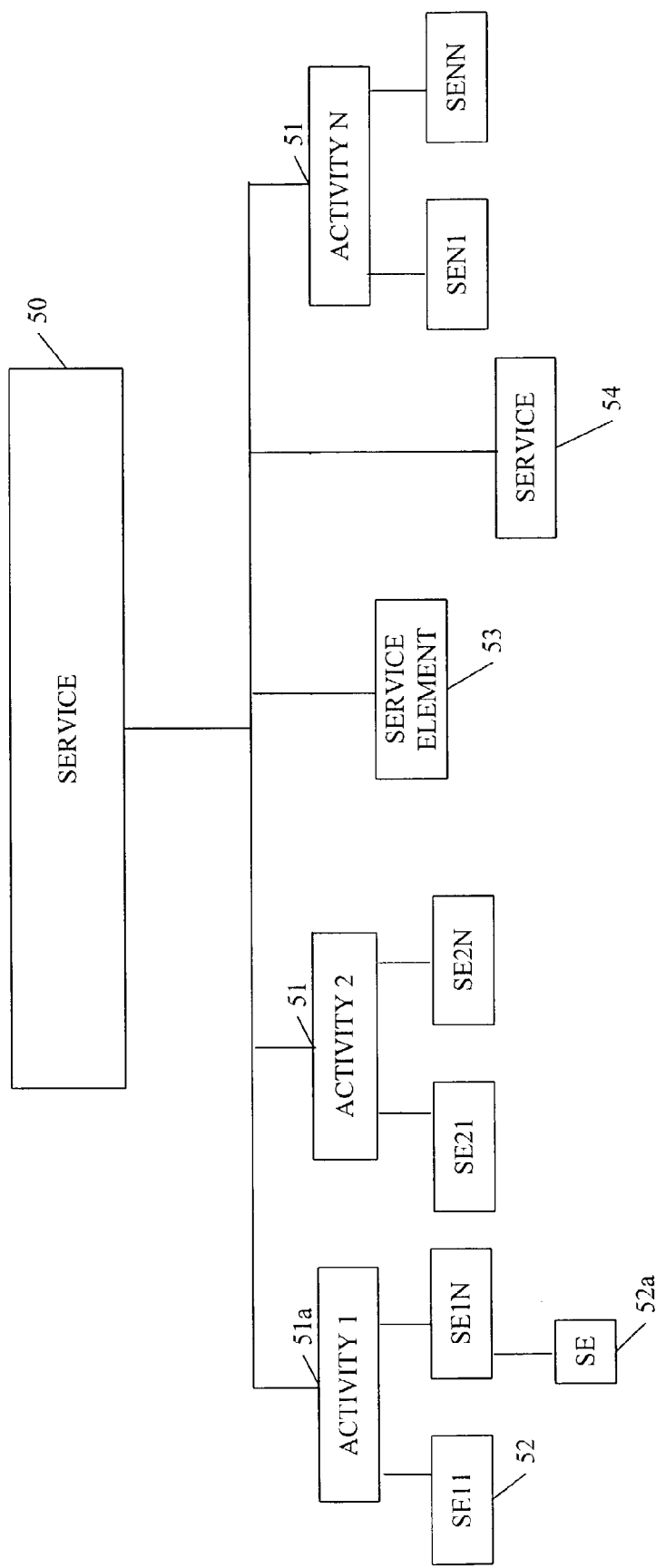
FIG. 6 illustrates diagrammatically a hierarchical structure of a service, according to one embodiment.

As shown in FIG. 1 and as illustrated by the diagram shown in FIG. 6 a service representation 50 has a hierarchical structure with the service representation 50 being associated with a number of activities 51 (activity 1 to N as shown in FIG. 6) and each activity in turn being associated with at least one and usually a number of different types of service elements 52 (service elements SE11 to SE1N for activity 1, service elements SE21 to SE2N for activity 2 and so on). A service element (such as service element SE1N in FIG. 6) may be associated with one or more other service elements 52a.

A service representation 50 may also be associated directly with one or more individual service elements 53 which are, in effect, activities having only a single service element. A service representation 50 may also be associated or linked to a representation of another service 54 which itself will be associated with a hierarchical structure of activities and service elements.

Figure 7:
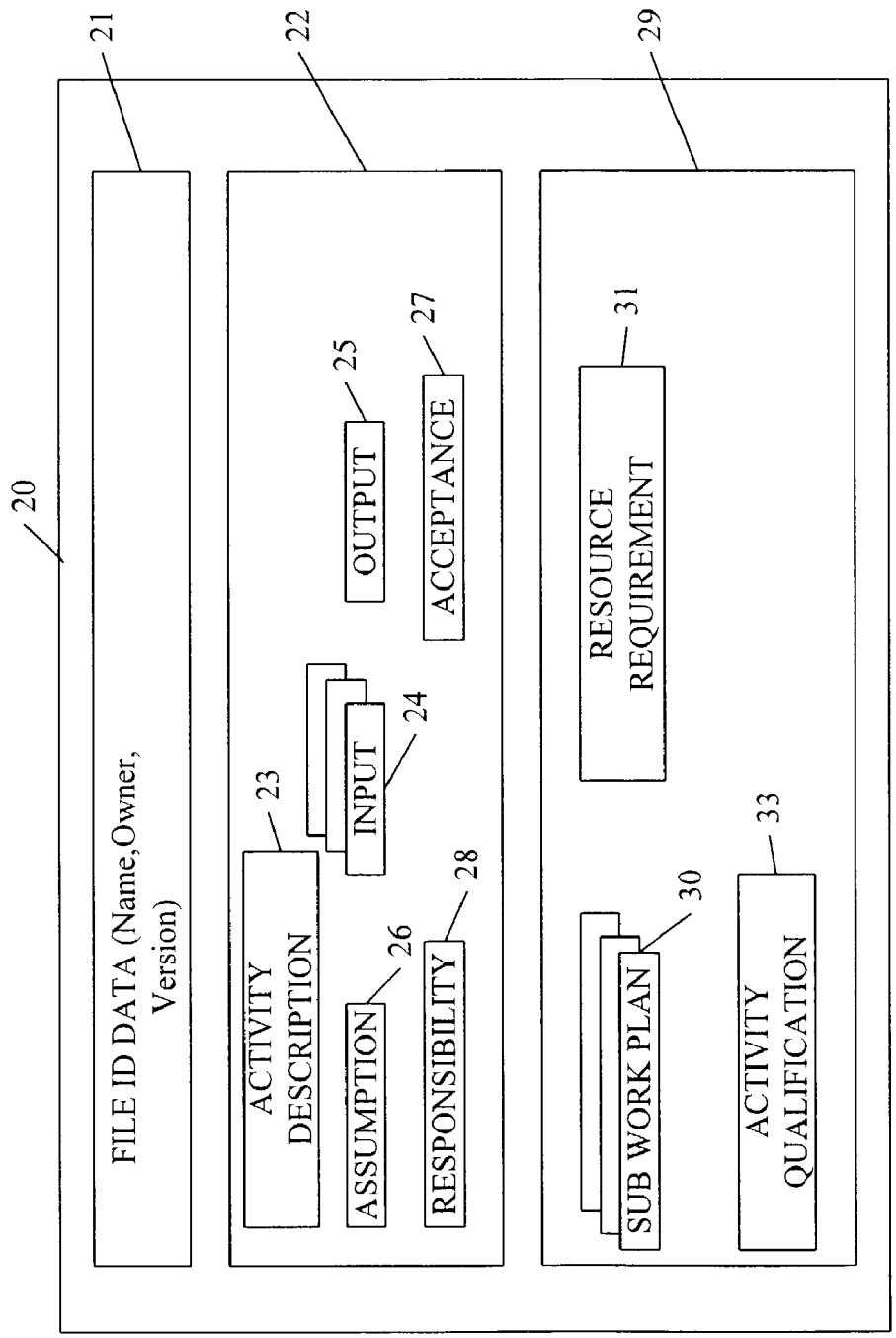
FIG. 7 represents diagrammatically the file structure of an activity file stored in an activity store of the data base, according to one embodiment.

FIG. 7 shows a representation of an activity file 20 forming the activity data for an activity. The activity file 20 includes file identity data 21 including a name allocated to the activity file, the owner of the activity file, that is the name of the person within the organization responsible for maintaining and updating the activity file, data identifying the version of the file and so on. The activity file associates the activity with a number of different types of service elements. These service elements include service elements that define sub-activities or sub-procedures within the activity (indicated by box 29 in FIG. 7) and service elements defining the activity itself and its relationship with other activities indicated by box 22 in FIG. 7.

The service elements defining the activity include a service element of type "description" indicated by box 23 in FIG. 7 associated with data defining text describing the activity, one or more service elements of type "input" indicated by boxes 24 in FIG. 7 (three service elements of type input are shown) associated with data defining text relating to inputs that may be required by the activity, one or more service elements of type "output" indicated by box 25 in FIG. 7 associated with data defining text relating to outputs or deliverables provided by the activity, one or more service elements of type "assumption" indicated by box 26 in FIG. 7 associated with data defining text defining any assumptions that are made by either the supplier or the customer in relation to this particular activity, one or more service elements of type "acceptance" indicated by box 27 in FIG. 7 associated with data defining text defining the conditions under which the outcome of the activity may be accepted by the supplier or the customer and one or more service elements of type "responsibility" indicated by box 28 in FIG. 7 associated with data defining text defining respective responsibilities of the supplier and the customer relating to the activity.

In the example shown in FIG. 7, the activity includes a number of different types of service elements associated with text defining sub-activities or sub-procedures within the activity. These include service elements of type "sub-work plan" indicated by box 30 in FIG. 7 which are associated with text defining sub-procedures or subsidiary work plans to be carried out in providing that activity, service elements of types "resource requirement" indicated by box 31 in FIG. 7 which are associated with data defining text defining the resources for the activity, and service activities of types "activity qualification" indicated by box 33 associated with data defining text defining any qualifications or conditions placed upon the activity by the supplier or customer. The activity data may also include, although not shown, a service element of type "activity type" defining the type of an activity, for example whether it is a service initiation, design, test or other type of activity.

It will, of course, be appreciated that the actual types of service elements that are associated with a particular activity will depend upon the nature of that particular activity and may include types of service elements that are not shown in FIG. 7. However, the activity defining service elements will include at least a service element of type "description". Each service element defining sub-activities or sub-procedures of an activity will itself have a file structure similar to that shown in FIG. 7, that is it will be associated with one or more service elements.

Figure 7A:
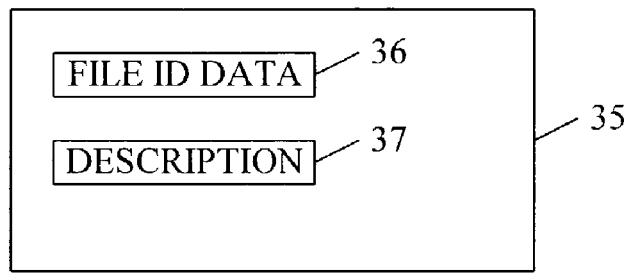
FIGS. 7a and 7b represent diagrammatically the file structure of a service element file and a service file respectively, according to one embodiment.

FIG. 7a shows a diagram illustrating an example of a file structure 35 for such a service element. This file structure includes file ID data 36 including the name, owner and version of the service element file, and, in addition, a service element of type "description" 37 associated with data defining text describing the service element. A service representation may be pre-defined by, for example, a system administrator responsible for the document provider or may be generated by a user of the user device 2 as will be described below.

Figure 7B:
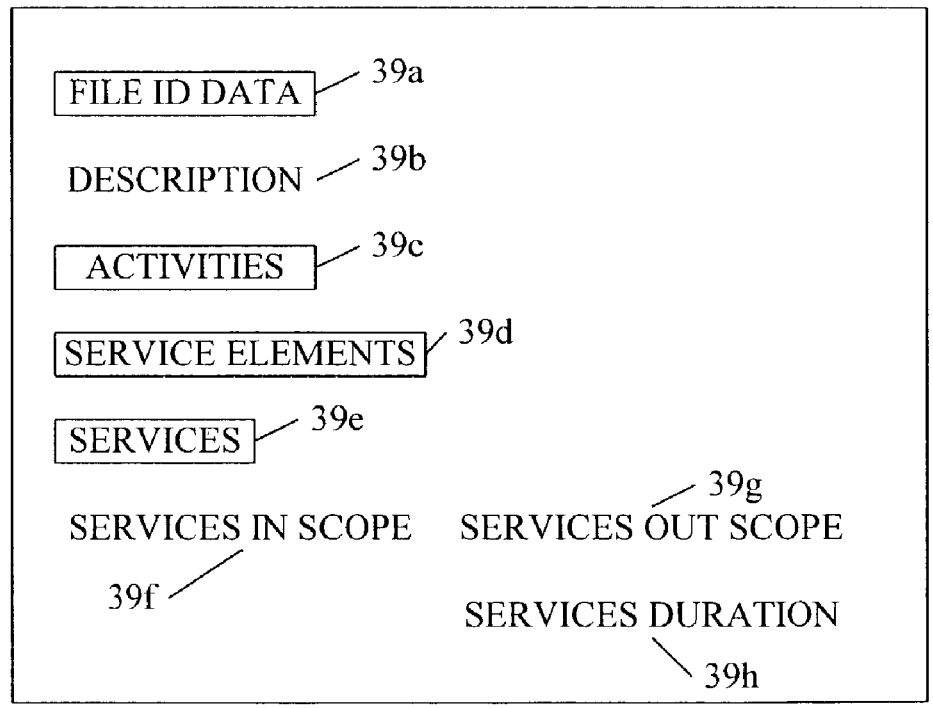

A service representation is stored as a service object or file in the services data store 12 where the service is pre-defined or in the user services data store 9 where the service is defined by a user. The service object or file has a structure similar to the activities files including, as shown in FIG. 7b, files ID data indicating the name of the service, its owner and version and so on (indicated by box 39a in FIG. 7b) and also links or pointers indicated by boxes 39c, 39d and 39e to the activities, service elements and services, respectively, associated with and forming part of the service representation. Where the service representation is pre-defined then the service representation will also include a service element of type "description" associated with data defining text defining the overall service (indicated by phantom box 39b). Where the service is pre-defined, then the service representation may also include service elements of the type "Service Inscope", "Service Outscope" and "Service Duration" indicated by phantom boxes 39f, 39g and 39h in FIG. 7b associated with text describing what falls inside and outside the scope of the service and the duration of the service.

In one embodiment, services, activities and service elements are implemented using XML and the data defining text is provided as a tagged file containing the corresponding text. The text is written in a default language (in this case English). Different language versions of the same text are provided by providing different versions of the same service element with the different versions being associated with different languages versions of the same text (such as German and Italian). Different language versions of the same service element include language identifiers in their ID data 36.

The service element data for the service elements may, as described above, be stored directly in the activity data file 20 (FIG. 7) or the activity date file 20 may simply contain pointers to files in the service elements store 11 containing the service element data. Similarly, although in the example described with reference to FIG. 7b above the service object contains pointers or links to the activities, service elements and services forming the service representation, the service object may actually contain the data for these activities, service elements and services.

The manner in which a user at the user device 2 generates a representation of service will now be described with the help of FIGS. 8a to 8d and 9. In order to generate a representation of a service, a user at the user device 2 activates his web browser to communicate with the document provider 4 via the network server 2a. In response to this, a web page is downloaded to the user device 2 via the network server 2a.

Figure 8A:
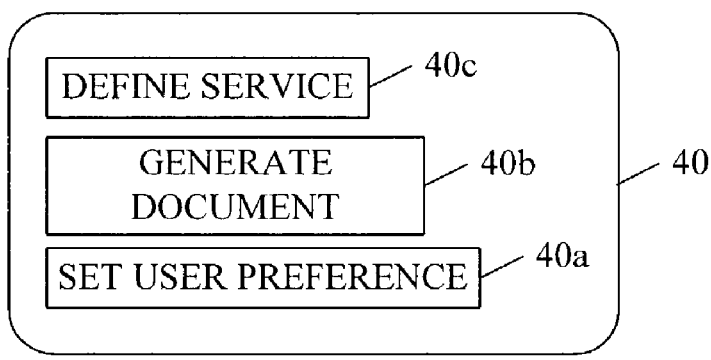
FIGS. 8a to 8d show screens that may be displayed to a user to enable selection of activities to form a service, according to one embodiment.

FIG. 8a shows a simplified version of a display screen 40 that may be displayed to the user at this stage. Although not shown in FIG. 8a, this display screen 40a will generally include a welcome message welcoming the user to the system and, in addition, includes a number of buttons, as shown a "Set User Preferences" button 40a that, when selected, takes the user to a further screen enabling the user to set user preferences such as a default language, a "generate document" button 40b that, when selected, enables a user to generate a document for use in providing a service and a "define service" button 40c that enables a user to define a new service.

Figure 8B:
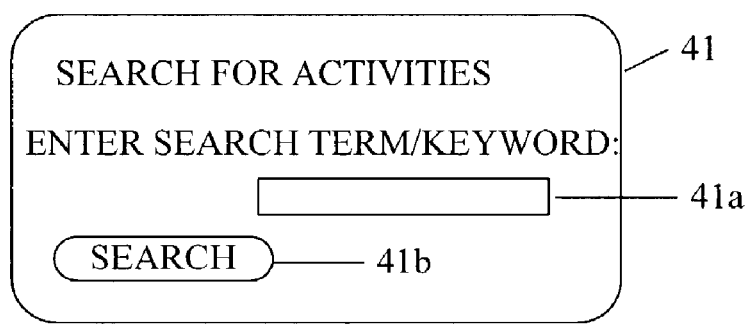

When the button "define service" 40c shown in FIG. 8a is selected using the pointing device 210a, then a search display screen 41 is supplied to the user. FIG. 8b shows an example of a search display screen 41. The search display screen 41 includes a data entry window 41a associated with a prompt such as "enter keyword" prompting the user to enter a search term into the window 41a using the keyboard 209a, and a search button 41b. When the user selects the search button 41b using the pointing device 210a, then the search criteria entered by the user in the window 41a is supplied by the network N to the controller 8 which accesses the data base 3 and conducts a search to locate all stored activities whose names meet the user's search criteria. As will be appreciated from the above, "activities" will include any service elements that can be associated with a service without forming part of an activity (that is a service element such as service element 53 shown in FIG. 6) and also any service (such as service 54 shown in FIG. 6) that can be associated with another service, provided they meet the search criteria.

Figure 8C:
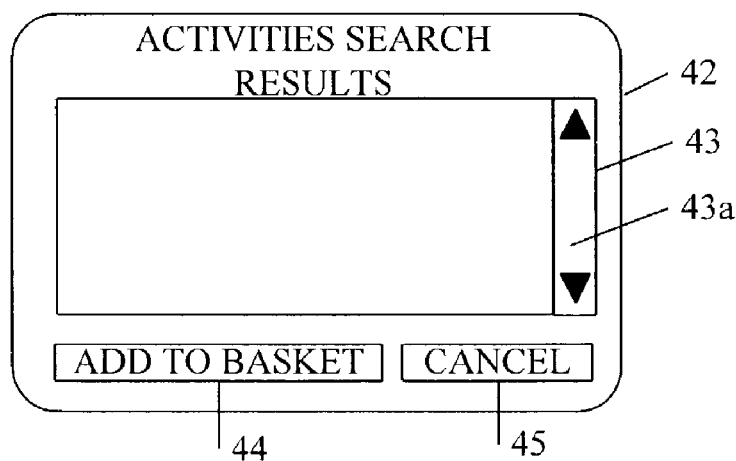

The results of the search are supplied to the user as a further display screen or window 42, an example of which is shown in FIG. 8c. This display screen 42 includes a window 43 in which the names of the activities meeting the search criteria are displayed. This window 43 may, as is well known in the art, be associated with a scroll bar 43a to enable a user to scroll up and down the list of service activities.

The user may then select any of the displayed activities for inclusion in the service that the user wishes to define. In order to select a service activity, the user highlights or "clicks on" (where "clicks on" refers to selection using the pointing device 210a) the desired service activity in the window 43 and then clicks on an "add to basket" button 44.

Figure 8D:
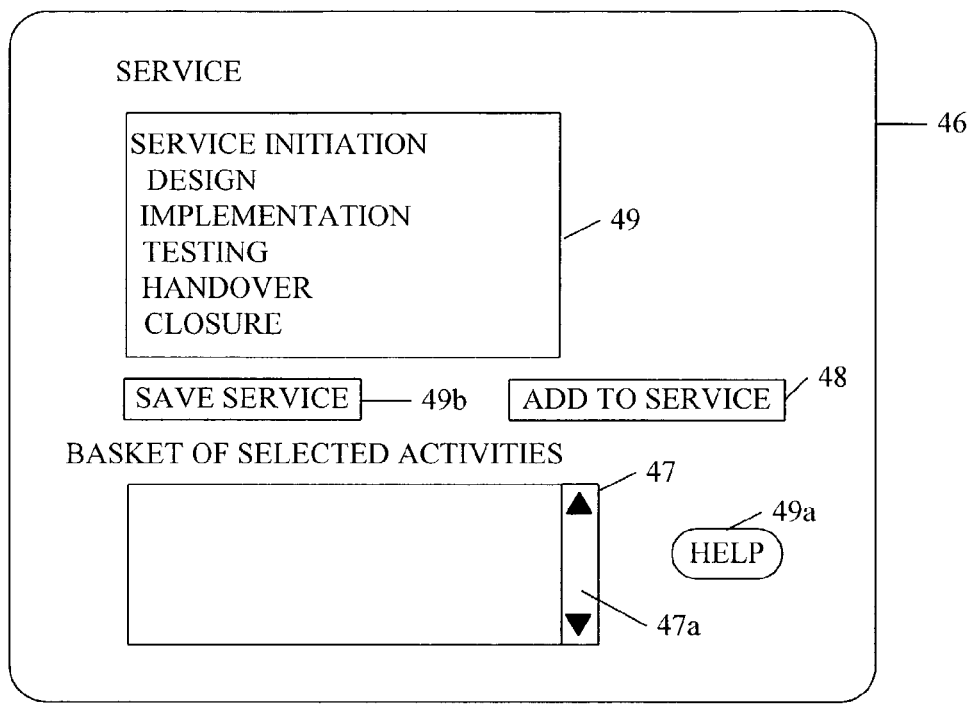

When the user has finished selecting activities from the activities shown in the window 43, then he clicks on or selects a cancel button 45. Selecting the cancel button 45 causes a further display screen to be displayed to the user. FIG. 8d shows an example of such a display screen 46. This display screen 46 includes a window 47 (which, like the window 43 may be associated with a scroll bar 47a) in which the names of the activities currently added to the user's basket are displayed. The activities within the basket are listed in the order in which they were selected from the search results. However, in order to define the search it is necessary for the activities to be arranged in the order in which they would occur in the providing of the service. Accordingly, the display screen 46 also includes an "add to service" button 48 and a service display window 49. In order to select a service activity to become part of the service being defined, the user highlights or clicks on the desired service activity in the window 47 and then clicks on the "add to service" button 48 which causes the name of that particular service to be added as the next service on the list that the user is generating in the window 49.

The display screen 46 also includes a help button 49a that, if selected by the user, causes a help web page to be downloaded from the document provider 4 showing detailed information regarding the highlighted activity such as the text associated with the service element of type "description" associated with the highlighted activity and the names of the service elements 29 associated with the highlighted activity defining sub-activities or sub-procedures so that the user can verify that the activity selected is correct.

The user may move between the display screens 46 and 42 shown in FIGS. 8d and 8c respectively, enabling further activities to be added to the basket and may also return to the search screen 41 to search for activities in accordance with different criteria. It will, of course, be appreciated that the search criteria may be as simple as enabling a user to cause a particular section of an alphabetically ordered list of activity names to be displayed in the window 43 or may enable a user to search for activities having specific names or names including specific letter strings.

In one embodiment, the user is defining a service representation of a service for the implementation of an Sun Enterprise 10000™ server installation and, as shown in the window 46 in FIG. 8d, the user has selected the following activities:

service initiation
design
implementation
testing
handover
closure

Once the user is satisfied with the selection of activities, then he clicks on a "save service" button 49b and is prompted to give the service a name and to submit the service to the document provider 4 via the network server 2a.

Figure 9:
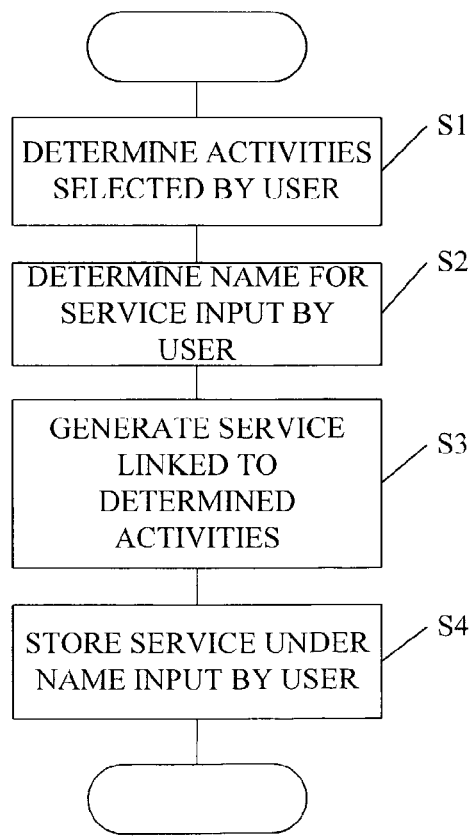
FIG. 9 shows a flowchart illustrating generation of a service by a service generator shown in FIGS. 2 and 3, according to one embodiment.

FIG. 9 shows a flow chart illustrating operation of the service generator 6 shown in FIGS. 2 and 3 in response to receipt by the document provider 4 of information defining a service from the user device 2. Initially, the service generator 6 determines (S1) from the supplied information the activities (which may include service elements that can be directly associated with a service and services that can be associated with a service) selected by the user, that is the activities listed in the window 49 in FIG. 8d, and then determines (S2) the name for the service input by the user. Next, the service generator 6 generates (S3) a service object having the file structure shown in FIG. 7b and having the name input by the user and including links to the activities selected by the user. Then, the service generator 6 stores (S4) that service object as the service representation under the name input by the user in the user services store 9 of the data base 3.

The user services store 9 will generally store a number of different service representations defined by different users at the same user device 2 or at different user devices 2 coupled to the document provider 4. As mentioned above, standard or predefined representation for services that are to be implemented by different users are pre-stored in the services store 12.

Figures 10, 11:
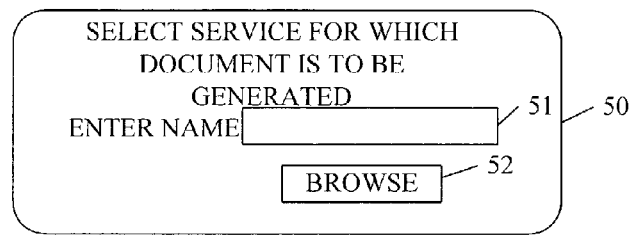
FIGS. 10 and 11 shows screens that may be displayed to a user to enable generation of a document.

The manner in which the document provider 4 provides different documents for a service representation stored in the services store 12 or user services store 9 will now be described with reference to FIGS. 10 to 15. When a user at the user device 2 elects to generate a document by selecting or clicking on the "generate document" button 40b in FIG. 8a, then a web page is downloaded to the user device 2 via the network server 2a. FIG. 10 shows a display screen 50 that may be displayed to the user at this stage prompting him to either type in the name of the service representation for which the document is to be generated in the window 51 or to click on the browse button 52 to enable a list of names of service representations stored in the services data store 9 to be downloaded so that the user can select a service representation from that list.

In one embodiment, the user selects the service "E10000 implementation for customer X". In response to receipt of this information, the document provider 4 downloads to the user device 2 via the network server 2*a* a display screen indicating the types of document available. FIG. 11 shows an example of such a display screen 53. This display screen includes a table having columns 54, 55, 56 and 57 headed document title, PDF, RTF and HTML.

The document title column lists the different document framework driver files that are available. In this embodiment, these are XSL (extensible Style sheet Language) style sheets and the available ones are, as shown in FIG. 11:

statement of work, test plan, delivery preparation worksheet, service definition document, service work plan, resource requirement summary, and proposals.

Each of the columns 55, 56 and 57 includes a check box 58 adjacent to the name of each document framework driver file enabling the user to select whether he wants his output document in PDF, RTF or HTML standard format. The display screen 53 also includes a download button 58*a* and a reset selection button 59.

The user selects a document framework driver file by clicking on or highlighting the title of the document framework driver file and checking one of the boxes 58 to indicate the document output format. If the user is unhappy with the selection, then he may reset the selection by clicking on the reset selection button 59 and selecting a different document title. When the user is happy with the selected document title and output format, then he clicks on the download button 58*a* to forward the request for the document via the network server 2*a* to the document provider 4.

Figure 12:
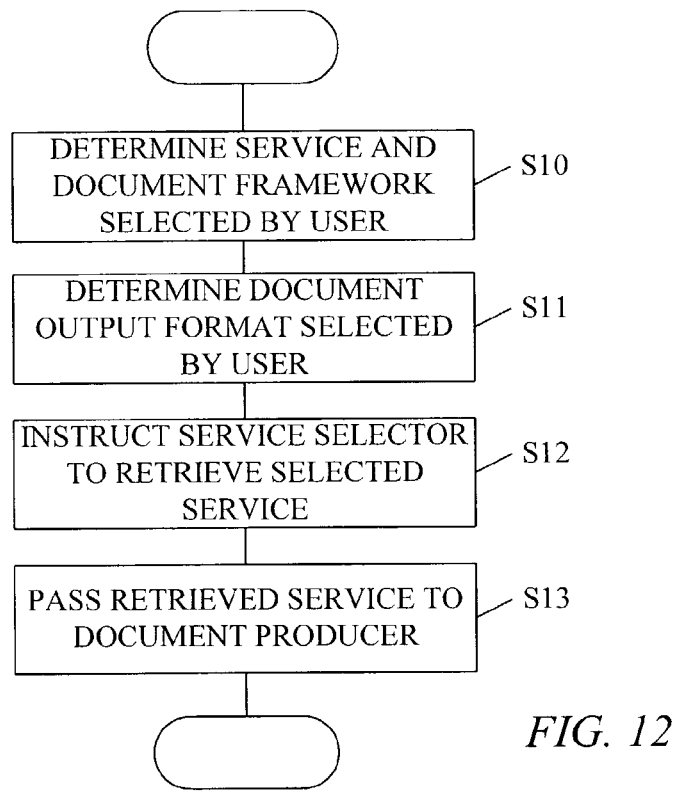
FIGS. 12 and 13 show flow charts for illustrating how a controller shown in FIGS. 2 and 3 may cause generation of a document.

FIG. 12 shows a flow chart illustrating operation of the document provider 4 upon receipt of such a document request. Thus, the controller 8 determines (S10) the service representation and document framework selected by the user in accordance with the information supplied by the user and then determines (S11) the document output format selected by the user, again in accordance with the information supplied by the user. Then, the controller 8 instructs (S12) the service selector 14 (FIG. 3) of the document generator 7 to retrieve the service file or object related to the selected service representation from the user services store 9 or services store 12 as the case may be and then passes (S13) the retrieved service object to the document producer 16.

Figure 13:
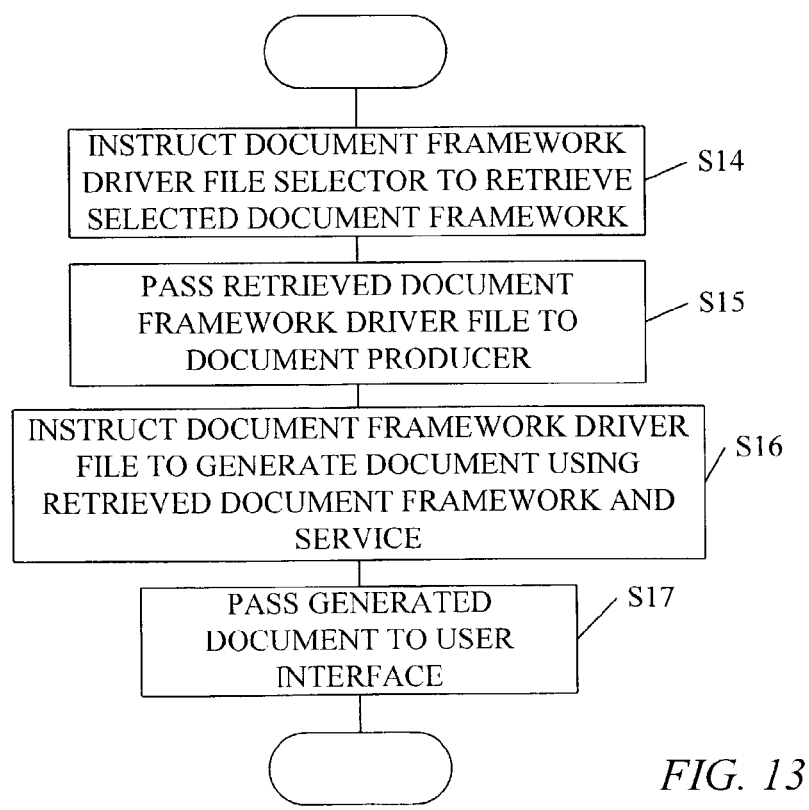

As shown in FIG. 13, the controller 8 also instructs (S14) the document framework driver file selector 15 to retrieve the document framework driver file selected by the user from the document framework driver file store 13, then passes (S15) the retrieved document framework driver file to the document producer 16 and instructs (S16) the document producer 16 to generate an output document in accordance with the rules of the retrieved document framework driver file which define which activities of the service are relevant for the document to be produced and, in respect of those activities, define which service elements are to be used and the manner in which and location at which the text for those service elements is to be incorporated in the document, that is the document layout, style, presentation and content.

Then, the controller 8 passes (S17) the generated document via the communications interface 5 and network server 2*a* to the user device 2 for display on the display 207 (FIG. 5). The user may then adapt the displayed document to insert any user definable information such as, for example, the customer's name and details and, if desired, print the document using the printer 208 or forward the document to another computing apparatus (for example, where appropriate, to computing apparatus of the customer) via the communications interface 206.

Figure 14:
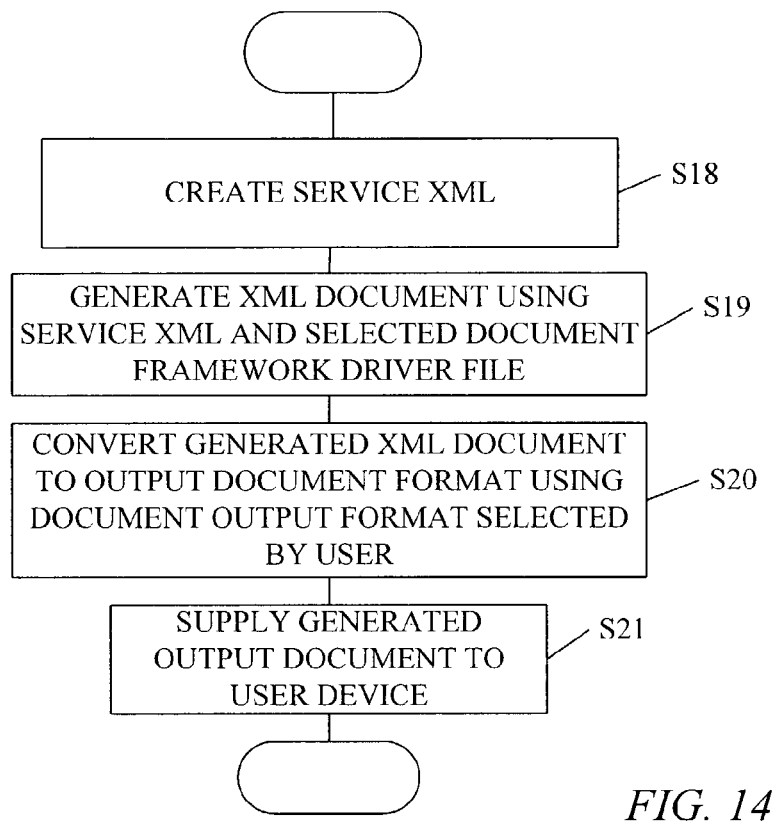
FIG. 14 shows a flow chart for illustrating generation of an output document by the document generator, according to one embodiment.

FIG. 14 shows operation of the document producer 16 in response to receipt of an instruction from the controller 8 to generate a document. Thus, initially, the service document creator 17 (see FIG. 4) of the document producer creates (S18) a service XML assembling the data relating to the activities linked to the selected service representation (which will include the data relating to any services and any service elements linked to the service directly or via the activities linked to the service) and conducting any necessary prefiltering as will be described in greater detail below.

Then, the document creator 18 of the document producer 16 generates (S19) an XML document using the service XML and the selected document framework driver file and then the output document creator 19 converts (S20) the generated XML document to the document output format selected by the user to produce the output document and then the controller 8 supplies (S21) the generated output document to the user device 2 via the network server 2*a*, causing the output document to be displayed to the user on a web page on the display 207.

Figure 15:
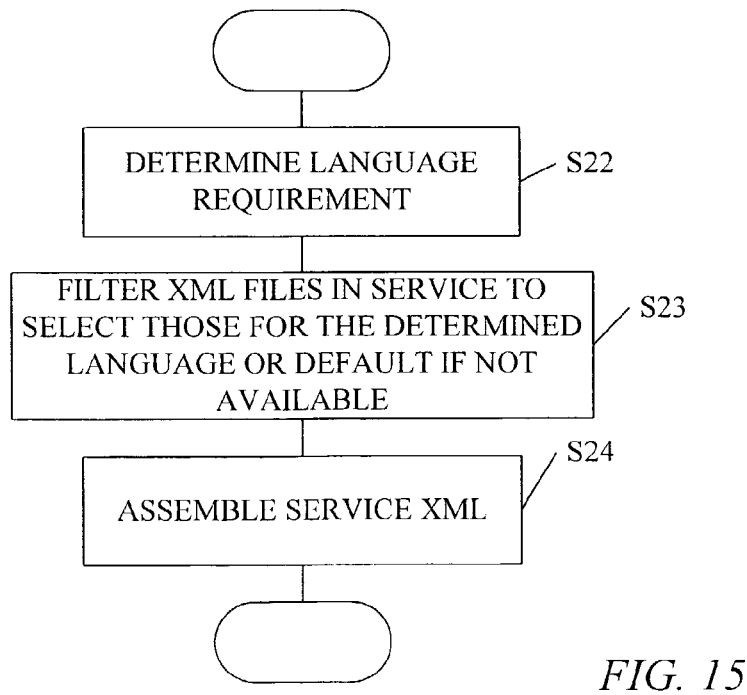
FIG. 15 shows a flow chart for illustrating in greater detail creation of a service XML (eXtensible Mark up Language) shown in FIG. 14, according to one embodiment.

Prefiltering of the data in the service may be effected in the creation of the service XML (S18) to select the service elements associated with text in the language for the selected document as illustrated by the flow chart shown in FIG. 15. Thus, the service document creator 17 determines the language indicated by the user (S22) as determined by the preference set by the user (see FIG. 8*a*). In the example shown in FIG. 11, this language is American English. Once the service document creator 17 has determined the language for the selected document framework driver file (S22), then the service document creator filters (S23) the service elements data files of the service representation to select the version of the service element that has file ID data identifying the associated text as being in the determined language or, where the determined language is not the default language of the document provider 4 and the service document creator 17 cannot find a version of the service element associated with text in the determined language, the version of the service element identified as being associated with text in the default language. Then, the service document creator 17 assembles (S24) the service XML to include the service element data for the determined language and any default service element data that may be required if there is no service element available in the determined language. An XML document is then generated (S19 in FIG. 14), converted to the user-selected output format (S20 in FIG. 14) and passed to the communications interface 5 to provide the user with the document.

The generation of specific documents will now be described in detail with reference to the flow charts shown in FIGS. 16 to 19 which illustrate how the XSL style sheets forming different document framework driver files generate the corresponding documents and appendices 1 to 4 which show the resulting documents in skeleton format (that is with large portions of the text omitted in the interests of brevity and the omissions shown by ellipsis). To aid understanding of the generation of the documents an illustrative but not exact indication of the XML markup of the corresponding XSL style sheet is given in the Appendices. It will, of course, be appreciated that this XML markup will not be shown in the actual generated document.

Figure 16A:
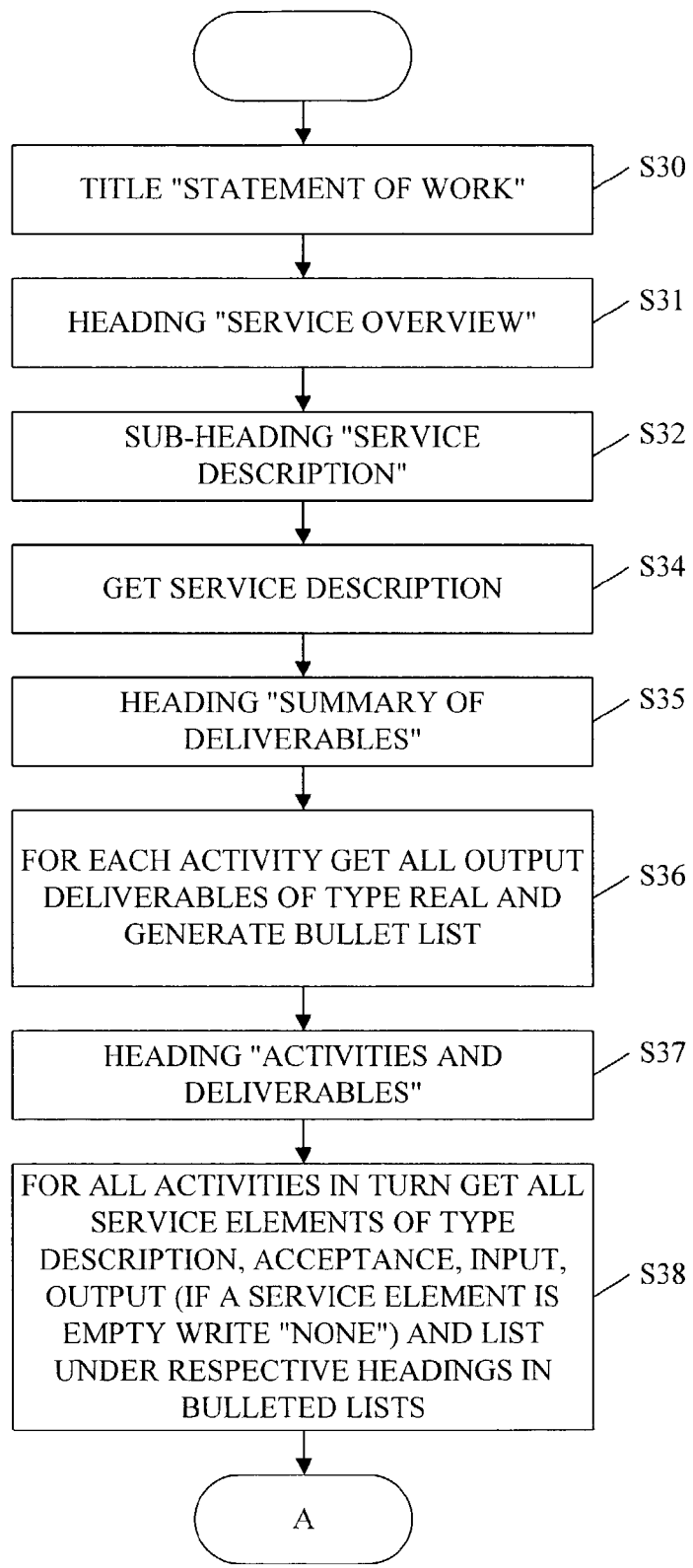
FIGS. 16 to 19 show flow charts illustrating different examples of document production by the document producer shown in FIG. 3 using different document framework driver files.
Figure 16B:
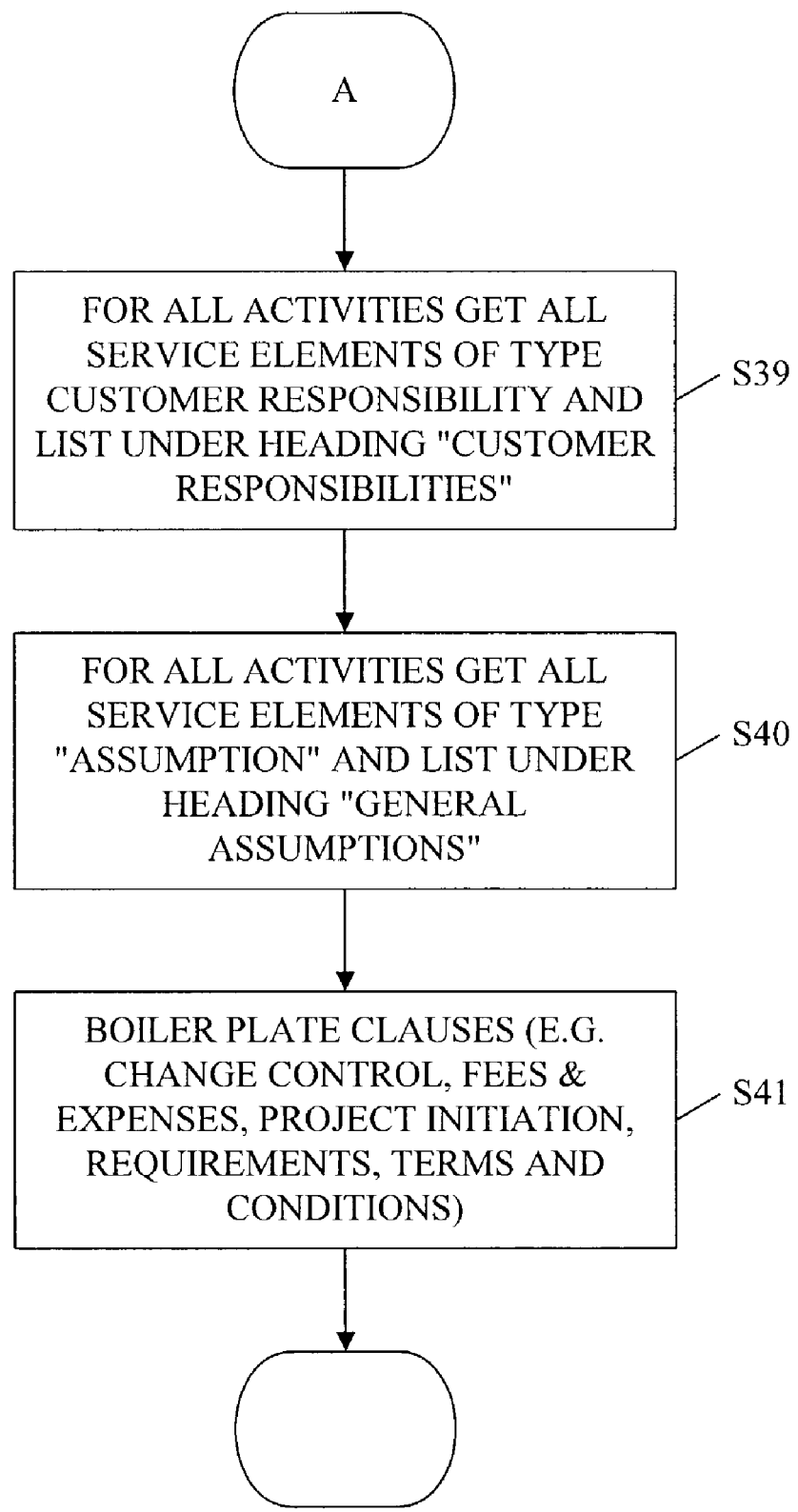

Production of a statement of work document setting out details of the work to be carried out for the customer for a standard or pre-defined service stored in the services store 12 relating to an E10000 Design and Implementation Service will first be described with reference to the flow chart shown in FIG. 16 and Appendix 1. As illustrated in FIG. 16, a first section of the XSL style sheet defines the content, position and presentation of a title for the document, in this case "Statement of Work", (S30), the next section (S31) defines the content, location and presentation of a subsidiary title, in this case "Service Overview" and the next section (S32) defines the content, location and presentation of a subsidiary heading, in this case "Service Description".

The next section of the XSL style sheet (S34 in FIG. 16) gets the service description by inserting into the document from service elements of the type "Service Description", "Service Inscope", "Service Outscope" and "Service Duration" associated with the pre-defined service representation the description associated with the service and text defining any limitations of the scope of the service and the duration of the service as shown in Appendix 1.

The next section (S35) of the XSL style sheet defines the content, location and presentation of a subsidiary heading, in this case "Summary of Deliverables" and the next section of the XSL style sheet (S36) identifies, for each activity of the pre-defined service representation indicated by the statement of work XSL style sheet the text associated with any service element of type "output" or "deliverable" that is defined as being of type "Real" and lists this in a bulleted list beneath the heading "Summary of Deliverables". In the example illustrated by Appendix 1 the deliverables include a service schedule and an availability assessment report.

The next section of the XSL style sheet (S37) defines the content, location and presentation of a heading, in this case, "Activities and Deliverables" and the next section (S38) of the XSL style sheet defines rules inserting, for each activity of the pre-defined service representation indicated by the XSL style sheet, into the document a heading giving the name of the activity from the file ID data followed, in sequence, by headings "description", "inputs" and "outputs" (deliverables) for that activity and inserting beneath the corresponding heading the text associated with any service element of that type associated with the activity or the word "none" if there is no service element of that type.

As illustrated in Appendix 1 the activities are: Service Initiation and Availability Assessment. As can be seen from Appendix 1, the activity "Service Initiation" has no service elements of type input and has a service element of type output forming the activity deliverable in the form of the service schedule while the activity "Availability Assessment" has service elements of type "input" in the form of infrastructure information and data and application capture and a service element of type output in the form of the Availability Assessment Report.

The next section of the XSL style sheet determines the content, location and presentation of a heading "Customer Responsibilities" and chooses from each activity element any service element file of the type "customer responsibility" and inserts the text associated with those service elements into the document as a numbered list (S39) as shown in Appendix 1.

The next section of the XSL style sheet gets for all activities of the service representation indicated by the XSL style sheet all service elements of the type "assumption" and lists these under the heading "General Assumptions" (S40) and the final section of the XSL style sheet (S41) inserts "boiler plate" or standard clauses whose, in this example, content, location and presentation are determined by XSL style sheet with the text content being contained in the XSL style sheet.

As discussed above, once the XML document has been generated as described with reference to FIG. 16, it is converted using another XSL style sheet into the output format selected by the user, in this case, PDF, RTF or HTML and downloaded to the user device 2. As will be seen, from Appendix 1, the resultant statement of work document is not complete but includes user insertion points define by angled brackets to enable the user to insert information such as the customer name.

Figure 17A:
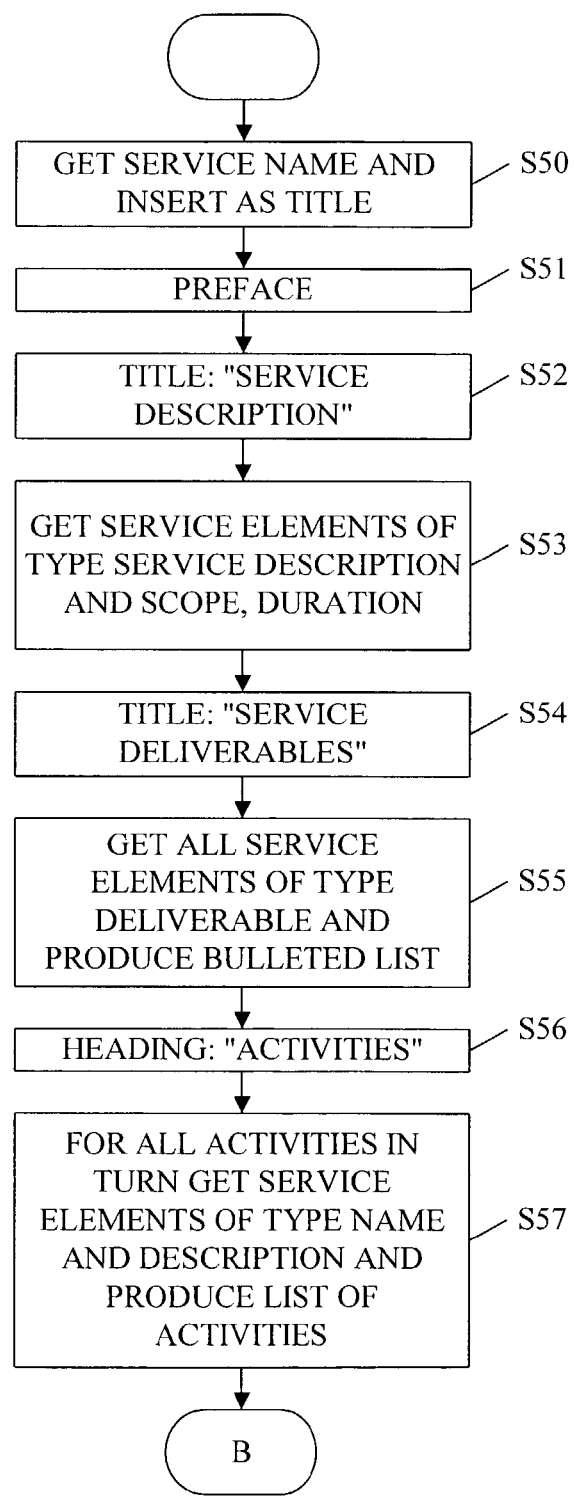
Figure 17B:
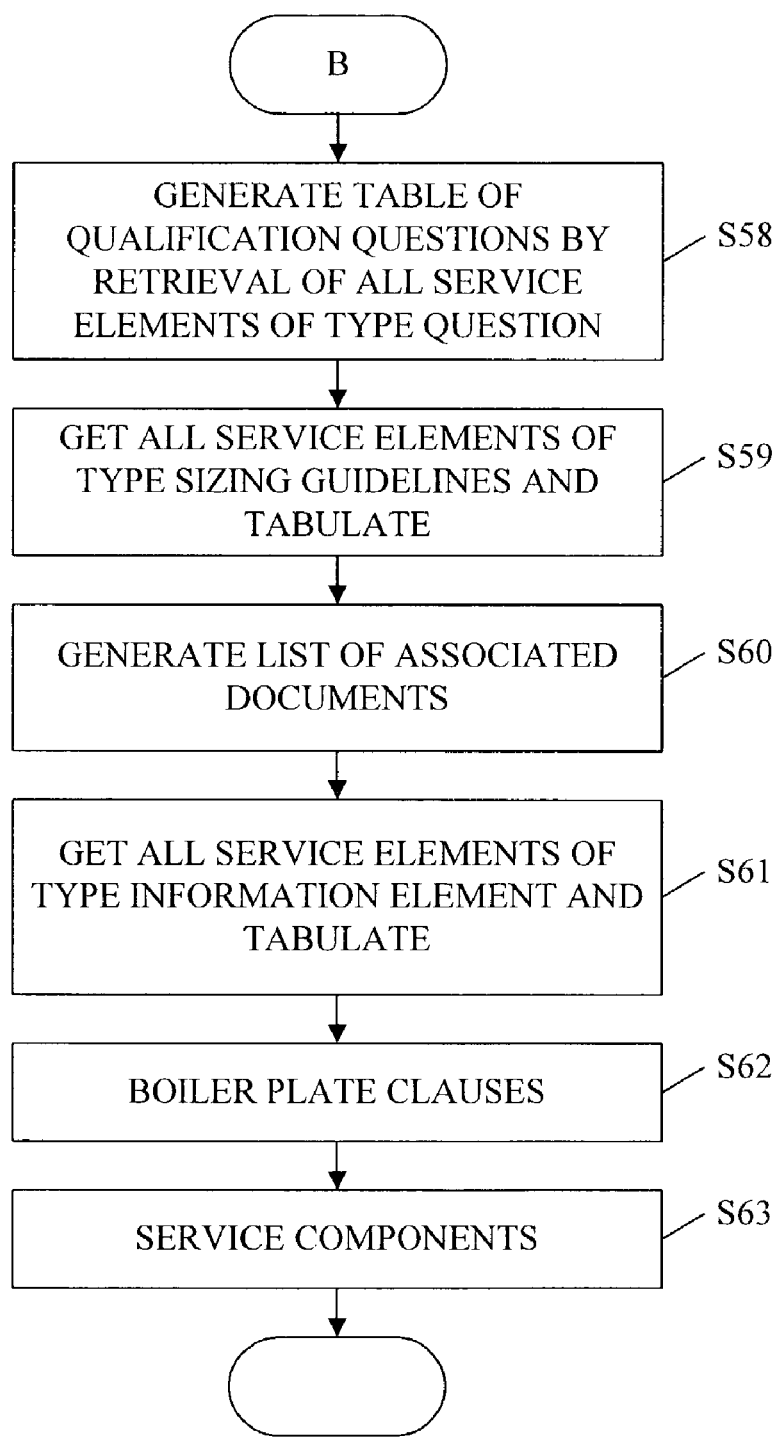

One of the other documents shown in FIG. 11 is a service definition document that defines the service to be provided. FIG. 17 is a flow chart illustrating generation of a service definition document by the service definition document framework driver file (which again is an XSL style sheet) when, for the same pre-defined service representation, the user selects "service definition document" from the list shown in FIG. 11.

The first section of the XSL style sheet retrieves the service name from the service object and inserts it as a title, in this case the title is "E10000 Application Readiness Service" (S50 in FIG. 17) followed by the document title "Service Definition Document". The next section of the XSL style sheet is a preface (S51) provided as text contained in the XSL style sheet that explains the function of the document, that is, in this case, that the document is for use by the supplier to enable understanding of the scope, approach and deliverables for the particular service.

The next section of the XSL style sheet determines the content, location and presentation of a document title, in this case, "Service Description" (S52).

The next section of the XSL style sheet causes each service element of type "service description", "service in scope", "service out scope" and "service duration" to be retrieved from the service object and inserts the associated text into the document (S53) as shown in Appendix 2.

The next section of the XSL style sheet (S54) determines the content, location and presentation of a title, in this case the title "Service Deliverables" and the next section of the XSL style sheet retrieves, for all activities of the service representation indicated by the XSL style sheet, all service elements of type "output" or "deliverable" that produce a real output and produces a bulleted list of the text associated with these service elements (S55) as illustrated in Appendix 2. The next section of the XSL style sheet defines the content, location and presentation of a heading, in this case the heading "Activities" (S56) and the following section (S57) of the XSL style sheet generates for all activities of the service representation indicated by the XSL style sheet, a list of these activities formatted so that the name of each activity retrieved from the file ID data is followed by the text associated with the service element of type "description" for that activity as shown under the heading "C. Activities" in Appendix 2.

The next section of the XSL style sheet provides in the document a heading "Qualification Questions" and generates a table of qualification questions by retrieving the text associated with all service elements of type "question" (S58) from all activities of the service representation indicated by the XSL style sheet.

The next section of the XSL style sheet provides, as shown in Appendix 2, a "Sizing Guidelines" heading and generates a table of sizing guidelines by retrieving from all activities of the service representation indicated by the XSL style sheet the text associated with all service elements of type "Sizing Guidelines" and tabulating the information (S59). The next section (S60) of the XSL style sheet generates a list of associated available documents for the service by retrieving the text associated with a service element of type "available documents" associated with the service representation identifying the names of the documents that can be used for that service.

The next section of the XSL style sheet inserts, as shown in Appendix 2, in the document the heading "Additional Information" and generates a table of additional information by retrieving the text associated with service elements of type "information element" in the service representation and tabulating the information (S61).

The next section of the XSL style sheet (S62) provides the boiler plates section for the document, in this case, as shown in Appendix 2, a section headed "Service Change Control" and the final section (S63) provides a heading "Service Components" and derives from the service representation the name of the service and the name of each included activity and associated service element listing them in a hierarchical bulleted list as shown in Appendix 2.

The examples of specific document generation described above with reference to FIGS. 16 and 17 and Appendices 1 and 2 are for a pre-defined service. Examples of generation of documents for a user-defined service will now be described. As will be appreciated, where a service is defined by a user on a customer-by-customer basis to meet customer-specific requirements, there will be no pre-stored description of the service, that is the service object or file shown in FIG. 7b will include simply the service object or file identity data and the links to the activities (which may include, as discussed above previously stored services that can be associated with the current service and also service elements that can be directly associated with the service without forming part of an activity).

A first example of generation of a document for a user-defined service will now be described where the service is an "E10000 Data Center Readiness Service" and the user has selected a "test procedures" plan document framework driver file. In this case, the user-defined service has been defined by the user to include the activities: "E10000 additional RAS testing", "system storage RAS testing" and "E10000 extended functionality testing", that is the user has selected the individual independent testing procedures that may be required to complete the test procedure.

Figure 18:
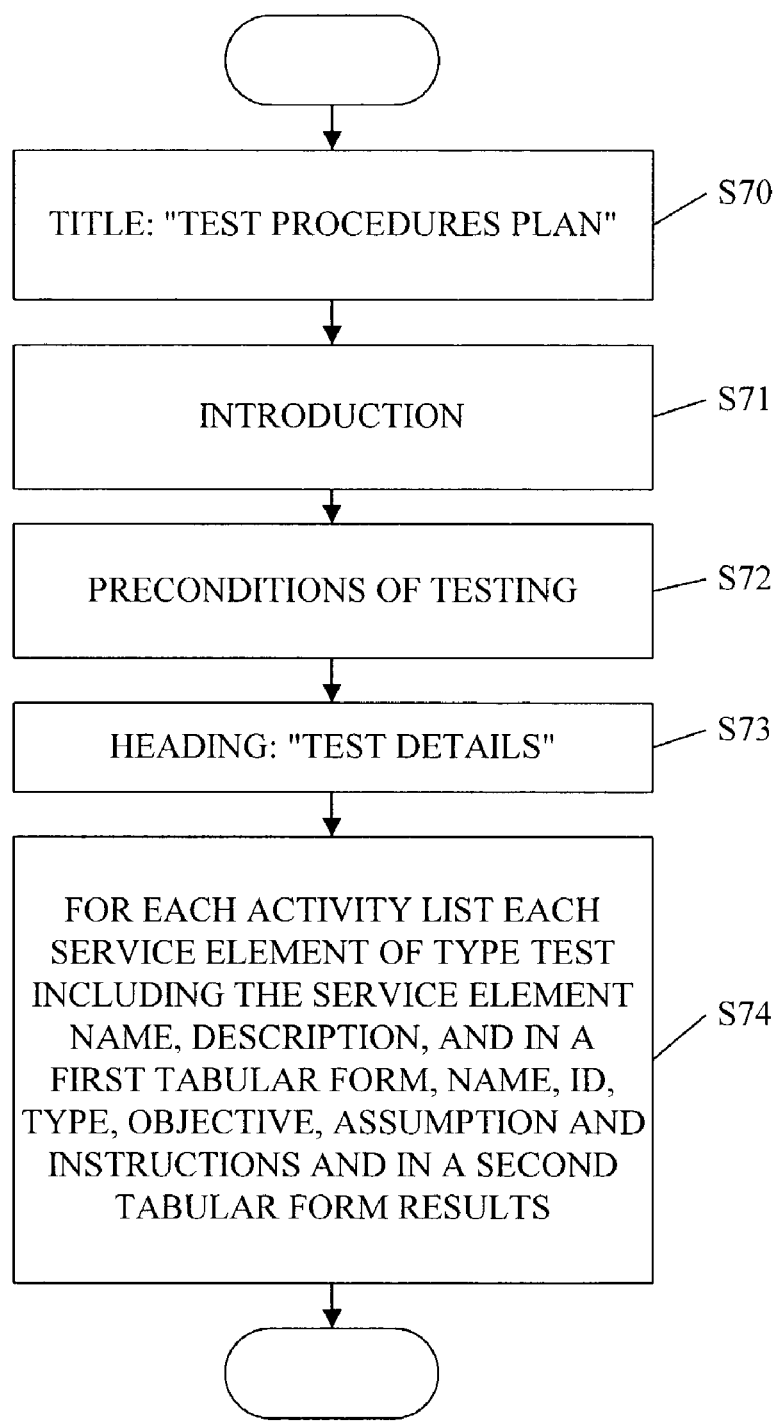

FIG. 18 shows a flow chart illustrating how an XSL style sheet forming the selected document framework driver file generates a "Test Procedures Plan" document for instructing the supplier personnel responsible for implementing the service about the test procedures that need to be carried out in providing the service while Appendix 3 illustrates an example of the resulting document.

This XSL style sheet has a first section which defines the document title and the location and presentation of the title with the document title being defined by the name of the service representation followed by the document title, in this case "Test Procedure Plan" (S70).

The XSL style sheet may also include, as shown in Appendix 3, instructions for incorporating into the document revision or version control information setting out in the document the date on which it was generated and the name of the user generating the document and may also include instructions to generate a standard test procedures completion form to be added to the documentation, followed by a table of contents as shown in Appendix 3.

This is followed, as shown in Appendix 3, by introduction and test objectives and strategy sections (S71) in the form of a body of text incorporated into the XSL style sheet and a second body of text headed "Preconditions of Testing" (S72) also incorporated in the XSL style sheet (S72). The next section of the XSL style sheet defines the content, position and presentation of a heading "Test Details" (S73).

As shown in Appendix 3, the final section of the XSL style sheet (S74) incorporates the test details. The XSL style sheet achieves this by, for each activity of the type test in turn in the service representation, retrieving the name of the activity from the file ID data, defining this as a heading and then setting out beneath the heading the text associated with the service element of type "description" for that activity followed by subsidiary sections incorporating the text associated with each service element of type "test" within that activity so that each subsidiary section has as a heading the name of the service element and is followed by, as shown in Appendix 3, a table giving the name, ID, type, objective, assumptions and instructions for the particular test by extracting the text data associated with service elements of type, name, ID, type, objective, assumption and instruction associated with the particular test service element.

The XSL style sheet follows this by a results section which, as shown in Appendix 3, includes again a table having a heading incorporating text retrieved from the service element of type "results" associated with the particular test activity.

As shown in Appendix 3, after incorporation of details of further tests for the activity "E10000 additional RAS testing", the XSL style sheet follows this by setting out in similar format the test details for each of the other activities of type "test" in the service that specified by the XSL style sheet. Although not shown in Appendix 3, these will have the same format as the first example shown for the test "E10000 additional RAS testing", namely a description followed by tabulated details relating to the test and a tabulated results section.

Figure 19:
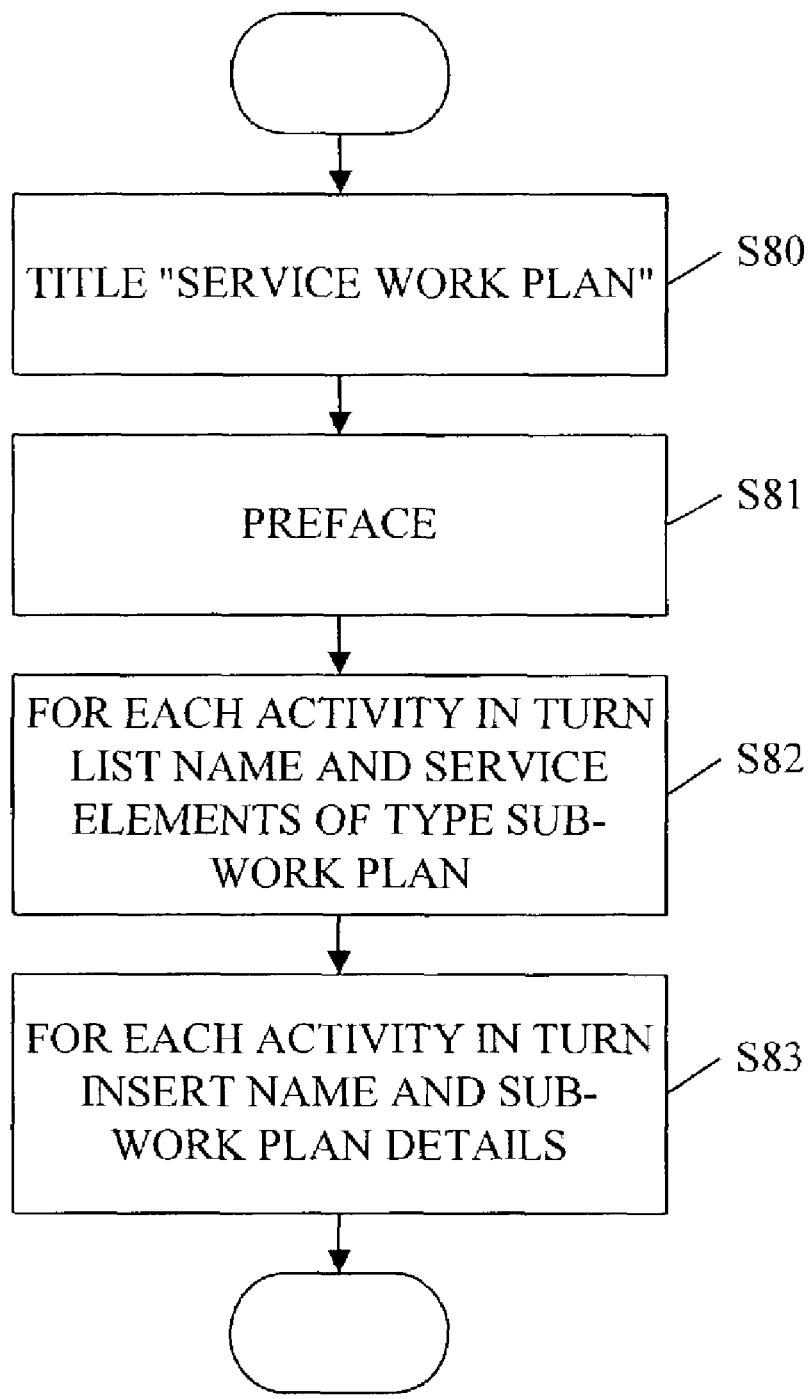

FIG. 19 shows a flow chart illustrating how a "service work plan" document framework driver file in the form of an XSL style sheet generates a service work plan for an "Availability Assessment Service" generated by a user while Appendix 4 shows an example of the resulting service work plan document.

A first section of the XSL style sheet (S80) defines the content location and presentation of a title for the document, in this case the service name "Availability Assessment Service" followed by the document title: "Service Work Plan".

A second section of the XSL style sheet defines the content, location and presentation of a heading "Preface" and sets out text contained in the XSL style sheet explaining that the document is for use by the suppliers staff involved in delivery of the service (S81) as shown in Appendix 4.

The next section of the XSL style sheet lists, for each activity associated with the service and indicated by the XSL style sheet in turn, the activity name and the text associated with all service elements of type "sub work plan" associated with that activity. The XSL style sheet provides this information in the form, as shown in Appendix 4, of a hierarchical bulleted list (S82).

The remaining section of the XSL style sheet accesses each activity of the service representation indicated by the XSL style sheet in turn and, for each activity, inserts into the document the activity name by retrieving it from the file ID data for that activity and lists beneath it the text associated with each service element of the type of "sub-work plan" inserting, for each such service element, the description and the table of work plan task associated with that service element (S83) by obtaining the text associated with the correspondingly named service element.

As can be seen from the above, each XSL style sheet defines rules controlling the formatting of a document and how that document is populated with text. In the case of standard or so-called boiler plate clauses, in the above examples, the text for these clauses is incorporated within the XSL style sheet. The remainder of the text is determined partly by the service representation for which the document is to be produced (in particular, the activities forming the service representation) and partly by the XSL style sheet in accordance with rules set out in the XSL style sheet.

As will be appreciated from the above, an XSL style sheet may define the service elements for which the associated text is to be included in the corresponding document using a number of different methods with the actual methods used for a document being determined by the document requirements. An XSL style sheet may define a service element by reference to its name or by type (by including a rule to obtain the text associated with all service elements of a particular type) with or without reference to the activity with which the service element is associated. An XSL style sheet may define an activity by name so that only specific ones of the activities associated with the service representation are accessed when generating the corresponding document or may simply instruct the document producer 16 to access all activities associated with the selected service representation. In addition, activities may, like service elements, be categorized by type (by incorporating within the activity data a service element of type "activity type") enabling the XSL style sheets to define the activities of the service representation that may be required for that document by type rather than by individual name by, for example, including a rule that may require that the text associated with specific service elements (defined by name or type) of activities of a specific type be incorporated into the document.

As mentioned above, where a service is pre-stored, then the service representation itself may include service elements of type description, scope, duration and so on associated with text defining, for example, an overall description of the service, the scope and duration of the service and so on. Where the service is a user defined service, then there will be no pre-stored overall service description. To accommodate this, different XSL style sheets may be provided for generating the same type of document (for example a service work plan) for a predefined and for a user-defined service. As another possibility the document framework driver files may include rules that cause an overall description of the service and its scope to be incorporated only if service elements of the relevant type are included within the service object file. As a further possibility, if desired, the XSL style sheets may include rules that cause a heading for a service description to be generated and include a prompt for the user to include his own description of the service. As another possibility an XSL style sheet may include rules that assemble an overall description of the service document from the text associated with the service elements of type "description" for the activities indicated by the XSL style sheet.

As described above, a user requests conversion of the XML document to a standard output format. Different output formats in addition to or in place of PDF, RTF and HTML may be provided and the user may also be given the facility to be provided with the XML document.

In the above described embodiments, when a user is defining a service, the user makes use of a search facility as described with reference to FIG. 8*b*. Where the number of available activities is relatively small, it may be possible to dispense with this search facility and simply to allow the user to select directly from a list of the names of the available activities. In this case, the display screens shown in FIGS. 8*b* and 8*c* would be omitted and the window 47 shown in FIG. 8*d* would be relabeled available activity.

In the above described embodiments, document generation is effected using the XML markup language which is advantageous in terms of standardization. It will, however, be appreciated that other markup languages may be used. In addition, different forms of document framework driver files may be used that do not necessarily use markup languages.

In the above described embodiments, activities and document frameworks are identified to the user by the names associated therewith. However, other forms of identifiers such as icons may be used.

In the above described embodiments, a user accesses the document provider 4 via the Internet using a web browser. It will, however, be appreciated that communication between the user device 2 and the document provider 4 may be, for example, via an intranet or local network. In addition, for at least one user, the document provider 4 may be local to their own computing apparatus. This user may be, for example, a systems administrator or person authorized to and responsible for version control and updating of service elements and activities.

In the above described embodiments, the data base 3 is directly coupled to the document provider 4. The data base 3 may, however, be physically separated from the document provider 4 and coupled to the document provider 4 via a network or even via an intranet or the Internet. In addition, the service generator 6 and document generator 7 may be physically separated, and for example, connected via a network or over an intranet or the Internet.

Although the above described example relates to installation of a computer service system it will, of course, be appreciated that embodiments may assist a user in preparation of documents for provision of services other than provision of computer hardware and/or software. One embodiment may be used to assist a user in production of documents necessary in providing any service that involves the carrying out of a number of activities and that may include production of a number of different documents, for example at different phases in providing the service. Examples of such services are, for example, services to manufacture or design products where the various different documents may relate to project planning, resource allocation, specification of components, testing etc., and services such as building projects where different documents may be required for different sub-contractors and at different phrases throughout the building project.

In one embodiment, a user may be enabled to generate documents for the carrying out of a service or process and enables standardization and uniformity between different documents by using, where possible, standard text without the user having to identify the specific standard text to be used. This is achieved by use of a data base that breaks a service down into individual activities each associated with a number of service elements of different type themselves associated with text appropriate to that service element type and by using document framework driver files that define rules for the formatting and populating of a document with text so that the resulting document includes text associated with service elements selected in accordance with the rules of the document framework driver file. This has many advantages for a user. For example, where a service is predefined and pre-stored, then a user may generate any one of a number of different documents for that service by selecting the service and the appropriate document framework driver file without having to concern himself with the actual content of the document. In addition, the user may define his own services by, as described above with reference to FIG. 11, selecting from an available list of activities and may then generate any one of a number of documents for that service by selecting one of the available document framework driver files. Thus, again, the user does not have to concern him or herself with the actual content of the document, but simply needs to select in a logical fashion the activities that are to be carried out in providing the service. Moreover, the above mentioned data base structure has the advantage that only one copy of each service element of a particular type and name need be held in the data base. This reduces the amount of storage that may be required and, more importantly, facilitates version control ensuring that, once a particular service element has been updated, there is no possibility of a user subsequently generating a document with an out-of-date version of the text for that service element.

In one embodiment, localization of documents may be enabled by providing different versions of service elements for different languages. This enables not only different language versions of the same document to be produced but also enables different local customs and/or legal requirements to be catered for in different versions of the same service element. Different versions of the same service element may also be provided for use in different countries which have the same official language (for example English) but which have different customs and/or legal requirements, for example.

In one embodiment, a data base comprising a large repository of knowledge may be enabled to be built up including not only activities that may included within a service but also a repository of stored services that is searchable by a user so that a user does not necessarily have to define his or her own service but may search for an existing service, modify it where necessary and then resave it in modified form so that a user does not necessarily have to define a service from scratch but may use or start from an existing defined service, thus saving the user time and effort.

The flow charts described herein represent exemplary embodiments of methods. The methods may be implemented in software, hardware, or a combination thereof. The order of method activities may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Appendix 1

<S:NAME> Availability Assessment</>
Statement of Work

<Customer Name>
SunReady Availability Assessment
Statement of Work  Produced by: <Name>
<Date>

1. Service Overview
1.1 Service Description
    <S/SEType=ServiceDescription>
    In this fixed-price service, Sun Microsystems, Inc. ("Sun") will review and assess <CUSTOMER>'s...........
    This is a high-level evaluation to provide ............: the Service will not provide <CUSTOMER> with ........... Moreover, the Service only entails .................
    </>
    <S/SEType=ServiceInScope>
    The scope of this Service is limited to:
    ♦ ........................
    ♦ ........................
    </>
    <S/SEType=ServiceOut/Scope>
    This service does not include .........................
    </>
    <S/SEType=ServiceDuration>
    </>

1.2 Summary of Deliverables

1. <SM/SEType=Deliverable:Name>Service Schedule</>
2. <SM/SEType=Deliverable:Name>Availability Assessment Report ("Report").
   </>
3. ..................................

2. Activities & Deliverables

2.1 <SM:Name>Service Initiation</>

2.1.1 Activity Description

<SM/SEType=ActivityDescription><CUSTOMER>'s Project Manager and Sun will review and agree on a schedule for ............ </>

2.1.2 Activity Inputs

None 2.1.3 Activity Deliverables

♦ <SM/SEType=Deliverable:Name>Service Schedule </>

2.2. <SM:Name>Availability Assessment</>

2.2.1 Activity Description

<SM/SEType=ActivityDescription>

Sun will perform an availability review ................

<SM/SEType=ActivityAcceptance>

From the time Sun provides <CUSTOMER> the Report, <CUSTOMER> has .................. </>

2.2.2. Activity Inputs

♦ <SM/SEType=Deliverable:Name>Infrastructure Information </>
  ♦ <SM/SEType=Deliverable>All infrastructure and network topology data relevant to ................
♦ <SM/SEType=Deliverable:Name>Data and Application Capture </>
  <SM/SEType=Deliverable>Sun-designated information ....... </>

2.2.3 Activity Deliverables

♦ <SM/SEType=Deliverable:Name> Availability Assessment Report ("Report").
</>

<SM/SEType=Deliverable>The Report will give Sun's findings on:
1. ...........................
2. ..........................
- ........................... </>

General

3.1 Customer Responsibilities

<CUSTOMER> shall provide Sun with the following:

1. <SM/SEType=CustomerResponsbility>A project manager ("Project Manager") to:
   - ......................
   - ......................
   - ......................
   - ...................... </>

2. <SM/SEType=CustomerResponsbility> ................... </>

3.2 General Assumptions

Sun will rely on the following assumptions, together with those stated elsewhere in this
............

1. <SM/SEType=Assumption>............... </>
2. <SM/SEType=Assumption>A Sun project manager will be assigned ............... </>

3.3. Change Control

Should <CUSTOMER> want to change ..........................

3.4 Fees and Expenses

The total fee which <CUSTOMER> will pay Sun for ........................

3.5 Project Installation Requirements

To initiate project activities ......................

3.6. Related Terms and Conditions

The following terms and conditions apply: ....................

THIS STATEMENT OF WORK IS EFFECTIVE AS OF \_\_/\_\_/\_\_. THE PARTIES HAVE READ THIS STATEMENT OF WORK AND AGREE TO BE BOUND HEREBY.

SUN MICROSYSTEMS,

<CUSTOMER>:

By: _____
Print: _____
Title: _____

Appendix 2

<Service:Name>E10000 Application Readiness Service</>:
Service Definition Document

PREFACE

For use by ............ requiring a further understanding of the service scope, approach and deliverables.

This document contains the following actions:
- Service Description
- Service Deliverables
- Service Modules
- Service Qualification Questions
- Service Sizing Guidelines
- Service Documentation Set
- Additional Information
- Service Change Control
- Service Components

A.    Service Description

This section describes the service including what is in and out of scope as well as an indication of its duration.

<S/SEType=ServiceDescription>

The fixed-price, fixed-scope, fixed-duration E10000 Application Readiness Service is designed to ensure that every new E10000 installation results in an appropriately configured system. This service provides .................... This service is mandatory for every new E10000 installation and includes the following:
- .................
- .................
- .................

</>

<S/SEType-ServiceInScope>

This service includes ...........................

</>

<S/SEType=ServiceOutScope>

This service does not include .......................

</>

\<S/SEType=ServiceOutScope\>

This service is estimated to take ..................

\</\>

B.  Service Deliverables

This section lists the deliverables from this service:
- \<S/SEType=Deliverable:Name\>Project Schedule\</\>
- \<S/SEType=Deliverable:Name\>Build Specification For E10000\</\>
- \<S/SEType=Deliverable:Name\>Test Procedures Plan for Installation and verification testing\</\>
- \<S/SEType=Deliverable:Name\>Basic E10000 Runbook\</\>
- \<S/SEType=Deliverable:Name\>Delivery Completion Form\</\>

C.  Activities

This section lists and describes all activities included in this service.

\<SM:Name\>Service Initiation \</\>

\<SM/SEType=Activity Description\>

In this phase, Sun will meet with \<Customer\> to review status of .........

\</\>

\<SM:Name\>E10000 Design \</\>

\<SM/SEType=ActivityDescription\>

After conducting a kick-off meeting. .............................

\</\>

\<SM:Name\>E10000 Installation and Design Implementation\</\>

\<SM/SEType=ActivityDescription\>

Sun will provide the project management to ................

\</\>

\<SM:Name\>E10000 Testing\</\>

\<SM/SEType=ActivityDescription\>

Sun will perform a series of basic functional tests to ................

\</\>

<SM:Name>E10000 Basic Runbook</>

<SM/SEType=ActivityDescription>

Sun will provide <Customer> with a base-system runbook ..............

</>

<SM:Name>Handover</>

<SM/SEType=ActivityDescription>

Sun will conduct a formal meeting with <Customer> to:

1. ...........................

2. ...........................

3. ...........................

</>

D.     Qualification Questions

<S/SEType=QualificationQuestions>

| # | Qualification Questions | Response |
|---|---|---|
| D.1. | <Question>Does the customer understand ................</Question> | YES/NO |
| D.2. | <Question>Does ...........................</Question> | YES/NO |

</>

E.  Sizing Guidelines
<S/SEType=ServiceSizingGuidelines>
To determine the appropriate size for the engagement ................ </>

F.  Service Documentation Set

This section lists the documents which are included with this service.

- Qualification
  - Service Definition Document
- Proposal
  - Statement of Work
- Delivery
  - Resources Requirements Summary
  - Delivery Preparation Worksheet
  - ..........................
  - ..........................
  - ..........................
  - Test Procedures Plan

</>

G.  Additional Information

This section lists additional information related to this service.

| Description | Location |
|---|---|
|  |  |
|  |  |
|  |  |
|  |  |

H. Service Change Control

This section lists any changes made by ..............................

| Change Date | Version | Change Description | Made by |
|---|---|---|---|
| <S:IssueDate> | <S:Version> | <S:ChangeDescription> | <S:Modified By> |
|  |  |  |  |
|  |  |  |  |

I. Service Components

This section gives a "bill of materials" breakdown ...................

- ..........................
- ..........................
- ..........................

</ />

Appendix 3

<S:Name>E10000 Datacenter Readiness Service</>:
Test Procedures Plan

Revision Information

| Revision | Date | Author | Revision Description |
|---|---|---|---|
| 1.0A | <GenerationDate> | <GeneratedBy> | Initial Document Creation |

2. Test Procedures Plan Review

This Test Procedures Plan has been reviewed by:

SUN MICROSYSTEMS <Customer>

Signature: ............................... ...............................
   Print Name: ............................... ...............................
   Title: ............................... ...............................
   Date: ............................... ...............................

Additional Comments:

3. Test Completion

Successful completion of the tests contained in this document has been verified by:

SUN MICROSYSTEMS <Customer>

Signature: ............................... ...............................
   Print Name: ............................... ...............................
   Title: ............................... ...............................
   Date: ............................... ...............................

Additional Comments:

Table Of Contents

Test Specification................................................................................................2
1. Test Completion...........................................................................................2
2. Introduction..................................................................................................5
3. Test Objectives & Strategy..........................................................................5
4. Preconditions of Testing..............................................................................5
5. Test Details..................................................................................................5
    5.1 <ServiceModule:Name>E10000 Additional RAS Testing</>..........................6
        5.1.1 <Test:Name>E10000 Alternate Pathed Network Failure Test</>............6
        5.1.2 <Test:Name>E10000 Fan Tray Failure Test .........................................7
        5.1.3 <Test:Name>E10000 System Board Failure Test ................................7
    5.2 <ServiceModule:Name>System Storage RAS Testing </>...............................7
        5.2.1 <Test:Name>Root Disk Failure................................................................6
        5.1.2 <Test:Name>SEVM Disk Failure.............................................................7
        5.1.3 <Test:Name>Array Failure........................................................................7
    5.3 <ServiceModule:Name>E10000 Extended Functionality Testing</>...............7
        5.3.1 <Test:Name>Automated Dynamic Configurations...............................7
        5.3.2 <Test:Name>Inter Domain Networking (IDN) Testing.........................7

1.  Introduction

This document defines the acceptance test plan for <Customer>'s..............</>

2.  Test Objectives & Strategy

The objectives of the tests are to ensure the correct operation of the key elements of the system delivered to <Customer>. The tests focus on the hardware and software features that are part of the current <Customer> Build Specification.

Each test will include:
- ...........................
- ...........................
- ...........................

</>

3.  Preconditions of Testing

...........................

4.  Test Details

4.1 <SM:Name>E10000 Additional RAS Testing</>

<SM:SEType=ActivityDescription>

Sun will perform a series of ........................</>

4.1.1. <SM:SEType=Test:Name>E10000 Alternative Pathed Network Failure Test</>

| Name: | |
|---|---|
| ID: | |
| Type: | |
| Objective: | |
| Assumptions: | |
| Instructions: | |

Results:

<SM/SEType=Test/SEType-Results> The expected results are that all ............

| Domain | Primary Adapter | Secondary Adapter | Pass / Fail | Date | Notes |
|---|---|---|---|---|---|
| Domain 1(example) | QfeO (example) | Qfe4 (example) | | | |
| | | | | | |

</>

4.1.2 <SM/SEType-Test:Name>E1000 Fan Tray Failure Test</>

..................................

4.1.3 <SM/SEType-Test:Name>E1000 System Board Failure Test </>

...............................

4.2 <SM:Name>System Storage RAS Testing</>

<SM/SEType=:ActivityDescription</>

4.2.1 <SM/SEType=Test:Name>Root Disk Failure</>

......................................

4.2.2 <SM/SEType=Test:Name>SEVM disk failure</>

..........................................

4.2.3 <SM/SEType=Test:Name>Array Failure</>

..........................................

4.3 <SM:Name>E10000 Extended Functionality Testing</>
<SM/SEType=:ActivityDescription</>

4.3.1 <SM/SEType=Test:Name>Automated Dynamic Configurations</>

..........................................

4.3.2. <SM/SEType=Test:Name>Inter Domain Networking (IDN) Testing</>

..........................................

Appendix 4

<Service:Name>Availability Assessment Service </>:
Service Work Plan

Preface
For use by all relevant Sun staff involved in the delivery of the service. ..................

This document contains the following sections:

- <SM:Name>Service Initiation</>
  - <SM/SEType=SubWorkPlan:Name>Qualification Phase </>
  - <SM/SEType=SubWorkPlan:Name>Proposal Phase </>
- <SM:Name>Availability Assessment>
  - <SM/SEType=SubWorkPlan:Name>Pre Delivery Preparation</>
  - <SM/SEType=SubWorkPlan:Name>Initial Engagement Meetings</>
  - <SM/SEType=SubWorkPlan:Name>Datacentre Overview (Support Services)</>
  - <SM/SEType=SubWorkPlan:Name>Interviews</>
  - <SM/SEType=SubWorkPlan:Name>System Data Collection (Support Services)</>
  - <SM/SEType=SubWorkPlan:Name>Skill Level and Training (Ed Services)</>
  - <SM/SEType=SubWorkPlan:Name>Data Analysis</>
  - <SM/SEType=SubWorkPlan:Name>Preliminary Findings and Recommendations Task</>
  - <SM/SEType=SubWorkPlan:Name>Deliverable Report and Presentations Tasks</>
- <SM:Name>Service Closures</>
  - <SM/SEType=SubWorkPlan:Name>Packaged Service Closures</>

1. <SM:Name>Service Initiation</>
   1.1. <SM/SEType=SubWorkPlan:Name>Qualification Phase</>

............................................

<SM/SETtype=SubWorkPlan:Description>
   Qualify the packaged service offering to ensure it meets the customer requirements.

<SM/SEType=SubWorkPlan/SEType=WorkPlanTasks>

| # | Task | Role | Completed |
|---|---|---|---|
| A.1 | <Task><br>☐ <Step>Check the SunPS website to make sure you have the latest version of the Service Methodology documents see:<br>..........................................................................<br>☐<Step>Review the available training for this service at:<br>..........................................................................<br>☐<Step>Review the Service Definition Document<br>☐<Step>..........................................<br>☐<Step>..........................................<br>☐<Step>..........................................<br></Task> | | |
| A.2 | <Task><br>☐<Step>..........................................<br>☐<Step>..........................................<br>☐<Step>..........................................<br></Task> | | |

</>

1.2 <SM/SETtype-SubWorkPlan:Name>Proposal Phase</>

<SM/SEType=SubWorkPlan:Description>

Complete all of the necessary steps to ensure that resources are available and that initial documentation has been issued to the customer <SM/SEType=SubWorkPlan/SEType=WorkPlanTasks>

| # | Task | Completed |
|---|---|---|
| A.1 | Contact ............................................. | |
| A.2 | Fill out the Delivery Preparation Checklist with the customer: ................................................ | |

2. <SM:Name>Availability Assessment</>

2.1    <SM/SEType=SubWorkPlan:Name>Pre-Delivery Preparation</>

<SM>SEType=SubWorkPlan:Description>

Prepare all hardware, software and documentation required for tasks performed at the customer's site and assess level of policy, processes and procedures within the customer's environment.

<SM/SEType=SubWorkPlan/SEType=WorkPlanTasks>

| # | Task | Who? | Completed |
|---|---|---|---|
| A.1 | Check delivery details with the customer ............ | | |
| A.2 | ............................................... | | |

2.2 <SM/SEType=SubWorkPlan:Name>Initial Engagement Meetings</>

<SM/SEType=SubWorkPlan:Description>

Prepare for the Kick Off and Interview Schedule Meetings to set expectations with customer

..................

<SM/SEType=SubWorkPlan/SEType=WorkPlanTasks>

| # | Task | Who? | Completed |
|---|---|---|---|
| A.1 | Pre-Assessment Meeting ............................... | | |
| A.2 | Kick-off Meeting<br>Conduct the Kick-Off Meeting to ............................. | | |

</>

2.3 <SM/SEType=SubWorkPlan:Name>Datacenter Overview (Support Services)</>

<SM/SEType=SubWorkPlan:Description>

Gather a general overview of datacenter environment.

<SM/SEType=SubWorkPlan.SEType=WorkPlanTasks>

| # | Task | Completed |
|---|---|---|
| A.1 | ............................... | |
| A.2 | ............................... | |

</>

2.4 <SM/SEType=SubWorkPlan:Name>Interviews</>

<SM/SEType=SubWorkPlan:Description>

Determine what actual practices and procedures are used day to day, in addition to discovery of areas which require further investigation.

<SM/SEType=SubWorkPlan/SEType-WorkPlanTasks>

| # | Task | Who? | Completed |
|---|---|---|---|
| A.1 | ............................ | | |
| A.2 | ............................ | | |

</>

2.5 <SM/SEType=SubWorkPlan:Name>System Data Collection (Support Services)</>

<SM/SEType=SubWorkPlan:Description>

Obtain information related to Sun operating systems. These steps are to be performed by Support Services, with results provided to the SunPs Consultant.

<SM/SEType=SubWorkPlan/SEType=WorkPlanTasks>

| # | Task | Who? | Completed |
|---|---|---|---|
| A.1 | ............................ | | |
| A.2 | ............................ | | |

</>

2.6 <SM/SEType-SubWorkPlan:Name>Skill Level and Training Analysis (Education Services)</>

<SM/SEType=SubWorkPlan:Description>

Obtain information related to Education Services expertise. Education Services performs these steps and provides results to Sun Consultant to include in deliverable report and recommendations.

<SM/SEType=SubWorkPlan/SEType=WorkPlanTasks>

| # | Task | Who? | Completed |
|---|---|---|---|
| A.1 | ............................ | | |
| A.2 | ............................ | | |

</>

2.7 <SM/SEType=SubWorkPlan:Name>Data Analysis</>

<SM/SEType-SubWorkPlan:Description>

Reconcile previously gathered information. Once the data is gathered, data analysis can begin. All information collected, including interview and electronic data, should be reviewed ................

<SM/SEType=SubWorkPlan/SEType=WorkPlanTasks>

| #   | Task | Who? | Completed |
|-----|------|------|-----------|
| A.1 | ...................................... |      |           |
| A.2 | ...................................... |      |           |

</>

2.8 <SM/SEType=SubWorkPlan:Name>Preliminary Findings and Recommendations Tasks</>

<SM/SEType=SubWorkPlan:Description>

Prepare a draft version of the deliverable report that contains ............................ to date.

<SM/SEType=SubWorkPlan/SEType=WorkPlanTasks>

| #   | Task | Who? | Completed |
|-----|------|------|-----------|
| A.1 | ...................................... |      |           |
| A.2 | ...................................... |      |           |

</>

2.9 <SM/SEType=SubWorkPlan:Name>Deliverable Report and Presentation Tasks</>

<SM/SEType=SubWorkPlan:Description>

Develop and finalize the deliverable report and optional customer presentation.

<SM/SEType=SubWorkPlan/SM/SEType-WorkPlanTasks>

| #   | Task | Who? | Completed |
|-----|------|------|-----------|
| A.1 | ...................................... |      |           |
| A.2 | ...................................... |      |           |

</>

3. <SM:Name>Service Closure>

3.1 <SM/SEType=SubWorkPlan:Name>Packaged Service Closure</>

<SM/SEType=SubWorkPlan:Description>

After the customer presentation and review of the deliverable report, to make any required revisions to the report and redeliver it to the customer. Also to provide feedback on this service and its methodology.

<SM/SEType=SubWorkPlan/SEType=WorkPlanTasks>

| # | Task | | Completed |
|---|---|---|---|
| A.1 | ........................................ | | |
| A.2 | ........................................ | | |

</>

What is claimed is:

1. A system, comprising:

one or more processors; and one or more memories respectively coupled to the one or more processors, wherein the one or more memories store one or more sets of program instructions that when executed by the one or more processors, cause the one or more processors to implement:

a database comprising a plurality of service objects each corresponding to a different service, wherein each service object has a hierarchical structure specifying a plurality of activities and one or more service elements for each activity, wherein each activity is a procedure to be carried out in providing the corresponding service, wherein each service object includes activity data identifying the service object's respective plurality of activities and specifying the one or more service elements for each activity, wherein each service element represents a component of the corresponding activity, and wherein the database comprises a representation of each service element for inclusion in a document to be used in performing the service;

wherein a particular service element of an activity of a service object stored in the database comprises at least one of: a description of the activity, an input for the activity, an output or deliverable from the activity, an assumption for the activity, information regarding responsibility for the activity, a subsidiary activity of the activity, or a sub-work plan of the activity;

a document template store comprising one or more document templates, wherein each document template specifies an organization of a type of document to be used in performing a service; and a document provider configured to:

identify, for a given service selected by a user, and for a given document template selected by the user, one or more service elements of one or more activities of a service object corresponding to the given service, wherein representations of the one or more service elements are to be included in a document organized in accordance with the given document template; and generate a document including representations of the one or more service elements, wherein the document is organized in accordance with the given document template, wherein the representations of the one or more service elements are included in the document without the user having to identify each representation separately.

2. The system as recited in claim 1, wherein the document provider comprises a service selector configured to:

provide an interface to select a service from a set of services for which service objects are stored in the database; and in response to input received from a user via the interface, select the given service.

3. The system as recited in claim 1, wherein the document provider comprises a document template selector configured to:

provide an interface to select a document template from the document template store;

in response to input received from a user via the interface, select the given document template.

4. The system as recited in claim 1, wherein the representation of at least one service element of the one or more service elements is stored as a text file.

5. The system as recited in claim 1, wherein for at least one service element of at least one activity of the given service, the service store comprises a first text representation in a first language and a second text representation in a second language, and wherein the document provider is configured to select one text representation of the first and second text representations for inclusion in the document based on a user-specified language preference.

6. The system as recited in claim 1, wherein the document generator generates the document without the user providing text to be included in the document.

7. The system as recited in claim 1, wherein, for each activity of the plurality of activities, the database comprises an activity object representing the activity, and wherein for each service element of an activity of the plurality of activities, the database comprises a service element object identifying the representation of the service element.

8. The system as recited in claim 7, wherein each activity object comprises one or more pointers to respective service element objects corresponding to service elements of the activity represented by the activity object.

9. The system as recited in claim 7, wherein each service element object comprises a pointer to a text representation of the service element represented by the service element object.

10. The system as recited in claim 1, wherein the instructions when executed further cause the one or more processors to implement:

a service object generator configured to generate a new service object in response to input received from a user and store the new service object in the database, wherein the input specifies one or more activities for a service to be represented by the service object.

11. The system as recited in claim 10, wherein the service object generator is further configured to:

in response to additional user input, retrieve an existing service object from the service store;

modify the existing service object; and store the modified service object in the database.

12. The system as recited in claim 1, wherein at least one activity of the one or more activities of the given service comprises a manually performed procedure.

13. The system as recited in claim 1, wherein, in specifying the organization of a type of document, each document template specifies one or more service elements whose representations are to be included in documents of that type, wherein said specifying the one or more service elements comprises at least one of: specifying a service element by name, specifying a service element by type, or defining a rule to select a service element.

14. The system as recited in claim 1, wherein at least one document template in the document template store comprises a standard clause or a boilerplate clause.

15. The system as recited in claim 1, wherein the document provider comprises an output format selector configured to:

provide an interface to specify an output format for the document generated by the document provider; and in response to input received from a user, generate the document in a specified output format and provide the document to the user.

16. A tangible computer readable storage medium, storing program instructions, that when executed by one or more processors, cause the one or more processors to implement:

a service store comprising a plurality of service objects each corresponding to a different service, wherein each service object has a hierarchical structure specifying a plurality of activities and one or more service elements for each activity, wherein each activity is a procedure to be carried out in providing the corresponding service, wherein each service object includes activity data identifying the service object's respective plurality of activities and specifying the one or more service elements for each activity, wherein each service element represents a component of the corresponding activity and specifies a representation for inclusion in a document to be used in performing the service;

wherein a particular service element of an activity of a service object stored in the service store comprises at least one of: a description of the activity, an input for the activity, an output or deliverable from the activity, an assumption for the activity, information regarding responsibility for the activity, a subsidiary activity of the activity, or a sub-work plan of the activity;

a document template store comprising one or more document templates, wherein each document template specifies an organization of a type of document to be used in performing a service; and a document provider configured to:
identify, for a given service selected by a user, and for a given document template selected by the user, one or more service elements of one or more activities of a service object corresponding to the given service, wherein representations of the one or more service elements are to be included in a document organized in accordance with the given document template; and
generate a document including representations of the one or more service elements, wherein the document is organized in accordance with the given document template, wherein the representations of the one or more service elements are included in the document without the user having to identify each representation separately.

17. The computer readable storage medium as recited in claim 16, wherein the document provider comprises a service selector configured to:
provide an interface to select a service from a set of services for which service objects are stored in the service store; and
in response to input received from a user via the interface, select the given service.

18. The computer readable storage medium as recited in claim 16, wherein the document provider comprises a document template selector configured to:
provide an interface to select a document template from the document template store;
in response to input received from a user via the interface, select the given document template.

19. The computer readable storage medium as recited in claim 16, wherein the representation of at least one service element of the one or more service elements is stored as a text file.

20. The computer readable storage medium as recited in claim 16, wherein for at least one service element of at least one activity of the given service, the service store comprises a first text representation in a first language and a second text representation in a second language, and wherein the document provider is configured to select one text representation of the first and second text representations for inclusion in the document based on a user-specified language preference.

21. The computer readable storage medium as recited in claim 16, wherein the document generator generates the document without the user providing text to be included in the document.

22. The computer readable storage medium as recited in claim 16, wherein, for each activity of the plurality of activities, the service store comprises an activity object representing the activity, and wherein for each service element of an activity of the plurality of activities, the service store comprises a service element object identifying the representation of the service element.

23. The computer readable storage medium as recited in claim 22, wherein each activity object comprises one or more pointers to respective service element objects corresponding to service elements of the activity represented by the activity object.

24. The computer readable storage medium as recited in claim 22, wherein each service element object comprises a pointer to a text representation of the service element represented by the service element object.

25. The computer readable storage medium as recited in claim 16, wherein the instructions when executed further cause the one or more processors to implement:
a service object generator configured to generate a new service object in response to input received from a user and store the new service object in the service store, wherein the input specifies one or more activities for a service to be represented by the service object.

26. The computer readable storage medium as recited in claim 25, wherein the service object generator is further configured to:
in response to additional user input,
retrieve an existing service object from the service store;
modify the existing service object; and
store the modified service object in the service store.

27. The computer readable storage medium as recited in claim 16, wherein at least one activity of the one or more activities of the given service comprises a manually performed procedure.

28. The computer readable storage medium as recited in claim 16, wherein, in specifying the organization of a type of document, each document template specifies one or more service elements whose representations are to be included in documents of that type, wherein said specifying the one or more service elements comprises at least one of: specifying a service element by name, specifying a service element by type, or defining a rule to select a service element.

29. The computer readable storage medium as recited in claim 16, wherein at least one document template in the document template store comprises a standard clause or a boilerplate clause.

30. The computer readable storage medium as recited in claim 16, wherein the document provider comprises an output format selector configured to:
provide an interface to specify an output format for the document generated by the document provider; and
in response to input received from a user, generate the document in a specified output format and provide the document to the user.

31. A computer-implemented method, comprising:
maintaining a service store comprising a plurality of service objects each corresponding to a different service, wherein each service object has a hierarchical structure specifying a plurality of activities and one or more service elements for each activity, wherein each activity is a procedure to be carried out in providing the corresponding service, wherein each service object includes activity data identifying the service object's respective plurality of activities and specifying the one or more service elements for each activity, wherein each service element represents a component of the corresponding activity and specifies a representation for inclusion in a document to be used in performing the service;

wherein a particular service element of an activity of a service object stored in the service store comprises at least one of: a description of the activity, an input for the activity, an output or deliverable from the activity, an assumption for the activity, information regarding responsibility for the activity, a subsidiary activity of the activity, or a sub-work plan of the activity;

maintaining a document template store comprising one or more document templates, wherein each document template specifies an organization of a type of document to be used in performing a service; and identifying, for a given service selected by a user, and for a given document template selected by the user, one or more service elements of one or more activities of a service object corresponding to the given service, wherein representations of the one or more service elements are to be included in a document organized in accordance with the given document template; and generating a document including representations of the one or more service elements, wherein the document is organized in accordance with the given document template, wherein the representations of the one or more service elements are included in the document without the user having to identify each representation separately.

32. The method as recited in claim 31, further comprising:
providing an interface to select a service from a set of services for which service objects are stored in the service store; and
in response to input received from a user via the interface, selecting the given service.

33. The method as recited in claim 31, further comprising:
providing an interface to select a document template from the document template store;
in response to input received from a user via the interface, selecting the given document template.

34. The method as recited in claim 31, wherein the representation of at least one service element of the one or more service elements is stored as a text file.

35. The method as recited in claim 31, wherein for at least one service element of at least one activity of the given service, the service store comprises a first text representation in a first language and a second text representation in a second language, the method further comprising:
selecting one text representation of the first and second text representations for inclusion in the document based on a user-specified language preference.

36. The method as recited in claim 31, wherein said generating the document comprises generates the document without the user providing text to be included in the document.

37. The method as recited in claim 31, wherein said maintaining the service store comprises:
for each activity of the set of activities, storing an activity object representing the activity in the service store, and for each service element of an activity of the set of activities, storing a service element object identifying the representation of the service element in the service store.

38. The method as recited in claim 37, wherein each activity object comprises one or more pointers to respective service element objects corresponding to service elements of the activity represented by the activity object.

39. The method as recited in claim 38, wherein each service element object comprises a pointer to a text representation of the service element represented by the service element object.

40. The method as recited in claim 31, further comprising:
generating a new service object in response to input received from a user and storing the new service object in the service store, wherein the input specifies one or more activities for a service to be represented by the service object.

41. The method as recited in claim 40, further comprising:
in response to additional user input,
retrieving an existing service object from the service store;
modifying the existing service object; and
storing the modified service object in the service store.

42. The method as recited in claim 31, wherein at least one activity of the one or more activities of the given service comprises a manually performed procedure.

43. The method as recited in claim 31, wherein, in specifying the organization of a type of document, each document template specifies one or more service elements whose representations are to be included in documents of that type, wherein said specifying the one or more service elements comprises at least one of: specifying a service element by name, specifying a service element by type, or defining a rule to select a service element.

44. The method as recited in claim 31, wherein at least one document template in the document template store comprises a standard clause or a boilerplate clause.

45. The method as recited in claim 31, further comprising:
providing an interface to specify an output format for the document to be generated; and
in response to input received from a user, generating the document in a specified output format and providing the document to the user.

* * * * *

UNITED STATES PATENT AND TRADEMARK OFFICE
CERTIFICATE OF CORRECTION

PATENT NO. : 7,703,003 B2  Page 1 of 1
APPLICATION NO. : 10/256345
DATED : April 20, 2010
INVENTOR(S) : Geoff Payne et al.

It is certified that error appears in the above-identified patent and that said Letters Patent is hereby corrected as shown below:

In the Claims:

Claim 39, col. 62, line 13, please deleted "38" and insert --37-- in place thereof.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,703,003 B2 | Page 1 of 1 |
| APPLICATION NO. | : 10/256345 | |
| DATED | : April 20, 2010 | |
| INVENTOR(S) | : Geoff Payne et al. | |

It is certified that error appears in the above-identified patent and that said Letters Patent is hereby corrected as shown below:

In column 3, line 53, delete "(extensible" and insert -- (eXtensible --, therefor.

In column 3, line 65, delete "(HID)" and insert -- (HD) --, therefor.

In column 9, line 16, delete "(extensible" and insert -- (eXtensible --, therefor.

Signed and Sealed this
Nineteenth Day of April, 2011

David J. Kappos
*Director of the United States Patent and Trademark Office*